United States Patent
Ebrahim Rezagah et al.

(10) Patent No.: US 12,279,151 B2
(45) Date of Patent: Apr. 15, 2025

(54) QUALITY OF SERVICE PROFILE CHANGE FOR A MULTI-QoS PROFILE SESSION

(71) Applicant: Fraunhofer-Gesellschaft zur Förderung der angewandten Forschung e.V., Munich (DE)

(72) Inventors: Roya Ebrahim Rezagah, Berlin (DE); Thomas Fehrenbach, Berlin (DE); Cornelius Hellge, Berlin (DE); Thomas Wirth, Berlin (DE); Thomas Schierl, Berlin (DE); Thomas Haustein, Berlin (DE); Sarun Selvanesan, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 382 days.

(21) Appl. No.: 17/655,435

(22) Filed: Mar. 18, 2022

(65) Prior Publication Data
US 2022/0295338 A1    Sep. 15, 2022

Related U.S. Application Data

(63) Continuation of application No. PCT/EP2020/075847, filed on Sep. 16, 2020.

(30) Foreign Application Priority Data

Sep. 20, 2019 (EP) .................................... 19198611

(51) Int. Cl.
*H04W 28/02* (2009.01)
*H04W 24/10* (2009.01)
(Continued)

(52) U.S. Cl.
CPC ....... *H04W 28/0268* (2013.01); *H04W 24/10* (2013.01); *H04W 28/24* (2013.01);
(Continued)

(58) Field of Classification Search
CPC . H04W 28/0268; H04W 24/10; H04W 28/24; H04W 36/0085; H04W 36/08;
(Continued)

(56) References Cited

U.S. PATENT DOCUMENTS

| 2005/0262228 A1 | 11/2005 | Trappeniers et al. |
| 2007/0097861 A1 | 5/2007 | Wilde et al. |
| 2022/0167217 A1* | 5/2022 | Wei .................... H04M 15/8038 |

FOREIGN PATENT DOCUMENTS

JP        2007097174 A        4/2007

OTHER PUBLICATIONS

3GPP TR 23.786, Study on architecture enhancements for the Evolved Packet System (EPS) and the 5G System (5GS) to support advanced V2X services, v16.1.0, Jun. 2019. 119 pages.
(Continued)

*Primary Examiner* — Vinncelas Louis
(74) *Attorney, Agent, or Firm* — PERKINS COIE LLP; Michael A. Glenn

(57) ABSTRACT

A wireless communication system includes one or more base stations, and one or more user devices, UEs. When running a certain application, the UE is to communicate over a session, like a PDU session, the session having associated therewith a current Quality of Service, QoS, profile, the current QoS profile selected form a plurality of different QoS profiles associated with the session. In case of a certain event, the wireless communication system is to replace the current QoS profile for the session by a new QoS profile for the session, the new QoS profile selected from a subset or all of the plurality of different QoS profiles associated with the session and/or one or more QoS profiles not yet associated with the session.

10 Claims, 12 Drawing Sheets

(51) Int. Cl.
    H04W 28/24    (2009.01)
    H04W 36/00    (2009.01)
    H04W 36/08    (2009.01)
    H04W 36/24    (2009.01)
    H04W 36/30    (2009.01)
    H04W 36/36    (2009.01)
(52) U.S. Cl.
    CPC ....... *H04W 36/0085* (2018.08); *H04W 36/08* (2013.01); *H04W 36/24* (2013.01); *H04W 36/304* (2023.05); *H04W 36/362* (2023.05); *H04W 36/249* (2023.05)
(58) Field of Classification Search
    CPC . H04W 36/24; H04W 36/304; H04W 36/362; H04W 36/249; H04W 36/0033; H04M 15/8038
    See application file for complete search history.

(56) References Cited

OTHER PUBLICATIONS

Ericsson, "Deconfiguration of conditional handover in NR" R2-1903519; 3GPP TSG RAN WG2 #105bis; Xi'an, China, Apr. 8-12, 2019. 6 pages.

Ericsson, "User plane aspects of conditional handover in NR" R2-1903515; 3GPP TSG RAN WG2 #105bis; Xi'an, China, Apr. 8-12, 2019. 4 pages.

Huawei et al "QoS Handling for V2X Communication Over Uu Reference Point" S2-1905732; 3GPP TSG-SA2 Meeting #133; Reno, NV, USA, May 13-17, 2019. 5 pages.

Huawei et al, "Support of multi-QoS profiles for V2X" R3-194536; 3GPP TSG-RAN3 Meeting #105; Ljubljana, Slovenia, Aug. 26-30, 2019. 3 pages.

Huawei, "Support of alternative QoS profiles" R3-194466; 3GPP TSG-RAN3 Meeting #105; Ljubljana, Slovenia, Aug. 26-30, 2019. 13 pages.

Huawei, "Support of handover for V2X QoS" R3-194468; 3GPP TSG-RAN WG3 #105; Ljubljana, Slovenia, Aug. 26-30, 2019. 3 pages.

S. Ahmadi, "5G NR, Architecture, Technology, Implementation, and Operation of 3GPP New Radio, Standards", Elsevier 2019, Chapter 2, pp. 260-262. 3 pages.

Ericsson, Analysis of NR Uu features for eV2X [online], 3GPP TSG RANWG2 #103bis R2-1815034, Internet <URL:http://www.3gpp.org/ftp/tsg_ran/WG2_RL2/TSGR2_103bis/Docs/R2-1815034.zip>, Oct. 12, 2018 (5 pages).

Nokia, Nokia Shanghai Bell, Network Based Monitoring and Reporting of QoS parameters for NR V2X Sidelink [online],3GPP TSG RAN WG2 #107 R2-1909284,Internet <URL:https://www.3gpp.org/ftp/tsg_ran/WG2_RL2/TSGR2_107/Docs/R2-1909284.zip>, Aug. 30, 2019 (6 pages).

* cited by examiner

QUALITY OF SERVICE PROFILE CHANGE FOR A MULTI-QoS PROFILE SESSION

CROSS-REFERENCE TO RELATED APPLICATIONS

This application is a continuation of copending International Application No. PCT/EP2020/075847, filed Sep. 16, 2020, which is incorporated herein by reference in its entirety, and additionally claims priority from European Application No. 19198611.6, filed Sep. 20, 2019, which is also incorporated herein by reference in its entirety.

FIELD OF THE INVENTION

The present application relates to the field of wireless communication systems or networks, more specifically to enhancements regarding the handling of quality of service, QoS, profiles for communications over sessions having associated therewith multiple QoS profiles, also referred to as multi-QoS profile sessions. Embodiments of the present invention concern the application of a preferred QoS profile in case of a certain event in the network, like a change in one or more network conditions or in case of a handover.

BACKGROUND OF THE INVENTION

FIG. 1 is a schematic representation of an example of a terrestrial wireless network 100 including, as is shown in FIG. 1(a), a core network 102 and one or more radio access networks RAN1, RAN2, . . . RANN. FIG. 1(b) is a schematic representation of an example of a radio access network RANn that may include one or more base stations gNB1 to gNB5, each serving a specific area surrounding the base station schematically represented by respective cells 1061 to 1065. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells; however, the RAND may include more or less such cells, and RAND may also include only one base station. FIG. 1(b) shows two users UE1 and UE2, also referred to as user equipment or user device, UE, that are in cell 1062 and that are served by base station gNB2. Another user UE3 is shown in cell 1064 which is served by base station gNB4. The arrows 1081, 1082 and 1083 schematically represent uplink/downlink connections for transmitting data from a user UE1, UE2 and UE3 to the base stations gNB2, gNB4 or for transmitting data from the base stations gNB2, gNB4 to the users UE1, UE2, UE3. This may be realized on licensed bands or on unlicensed bands. Further, FIG. 1(b) shows two IoT devices 1101 and 1102 in cell 10 4, which may be stationary or mobile devices. The IoT device 1101 accesses the wireless communication system via the base station gNB4 to receive and transmit data as schematically represented by arrow 112 1. The IoT device 1102 accesses the wireless communication system via the user UE3 as is schematically represented by arrow 1122. The respective base station gNB1 to gNB5 may be connected to the core network 102, e.g. via the S1 interface, via respective backhaul links 1141 to 1145, which are schematically represented in FIG. 1(b) by the arrows pointing to "core". The core network 102 may be connected to one or more external networks. Further, some or all of the respective base station gNB1 to gNB5 may be connected, e.g. via the S1 or X2 interface or the XN interface in NR, with each other via respective backhaul links 1161 to 1165, which are schematically represented in FIG. 1(b) by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

It is noted that the information in the above section is only for enhancing the understanding of the background of the invention and therefore it may contain information that does not form known technology that is already known to a person of ordinary skill in the art.

Starting from a known technology as described above, there may be a need for improvements of a communication in a wireless communication system over a session having associated therewith multiple QoS profiles.

SUMMARY

According to an embodiment, a wireless communication system may have: one or more base stations, and one or more user devices, UEs, wherein, when running a certain application, the UE is to communicate over a session, like a PDU session, the session having associated therewith a current Quality of Service, QoS, profile, the current QoS profile selected form a plurality of different QoS profiles associated with the session, and wherein, in case of a certain event, the wireless communication system is to replace the current QoS profile for the session by a new QoS profile for the session, the new QoS profile selected from a subset or all of the plurality of different QoS profiles associated with the session and/or one or more QoS profiles not yet associated with the session.

Another embodiment may have a user device, UE, for a wireless communication system, wherein the UE is served by a serving base station and, when running a certain application, the UE is to communicate over a session, like a PDU session, the session having associated therewith a current Quality of Service, QoS, profile, the current QoS profile selected form a plurality of different QoS profiles associated with the session.

Another embodiment may have a base station for wireless communication system, wherein the base station is to serve a user device, UE, of the wireless communication system, the UE, when running a certain application, communicating over a session, like a PDU session, the session having associated therewith a current Quality of Service, QoS, profile, the current QoS profile selected form a plurality of different QoS profiles associated with the session, and wherein, in case of a certain event, the base station is to replace the current QoS profile for the session by a new QoS profile for the session, the new QoS profile selected form the subset or all of the plurality of different QoS profiles associated with the session and/or one or more QoS profiles not yet associated with the session.

Another embodiment may have a base station for wireless communication system, wherein the wireless communication system includes a UE served by a source base station, the UE, when running a certain application, the UE is to communicate over a session, like a PDU session, the session having associated therewith a current Quality of Service, QoS, profile, the current QoS profile selected form a plurality of different QoS profiles associated with the session, and in case of a handover, HO, from the source base station to the target base station, the target base station is to obtain the subset or all of the plurality of QoS profiles for the session or information indicating the subset or all of the plurality of QoS profiles for the session, and select a new or admitted QoS profile for the session the target base station is to provide, the new or admitted QoS profile being the same as or being different from the current or source QoS profile provided by the source base station before the HO.

According to another embodiment, a method for a communication in a wireless communication system, the wireless communication system including one or more base stations, and one or more user devices, UEs, may have the steps of: when running a certain application by a UE, communicating over a session, like a PDU session, the session having associated therewith a current Quality of Service, QoS, profile, the current QoS profile selected form a plurality of different QoS profiles associated with the session, and in case of a certain event, replacing the current QoS profile for the session by a new QoS profile for the session, the new QoS profile selected from a subset or all of the plurality of different QoS profiles associated with the session and/or one or more QoS profiles not yet associated with the session.

According to another embodiment, a method for a communication in a wireless communication system, the wireless communication system including one or more base stations, and one or more user devices, UEs, may have the steps of: serving a UE is served by a serving base station and when running a certain application by the UE, communicating over a session, like a PDU session, the session having associated therewith a current Quality of Service, QoS, profile, the current QoS profile selected form a plurality of different QoS profiles associated with the session.

According to still another embodiment, a method for a communication in a wireless communication system, the wireless communication system including one or more base stations, and one or more user devices, UEs, may have the steps of: serving, by a base station a user device, UE, of the wireless communication system, when running a certain application by the UE, communicating over a session, like a PDU session, the session having associated therewith a current Quality of Service, QoS, profile, the current QoS profile selected form a plurality of different QoS profiles associated with the session, and in case of a certain event, replacing, by the base station, the current QoS profile for the session by a new QoS profile for the session, the new QoS profile selected form the subset or all of the plurality of different QoS profiles associated with the session and/or one or more QoS profiles not yet associated with the session.

According to another embodiment, a method for a communication in a wireless communication system, the wireless communication system including a UE served by a source base station, the UE, when running a certain application, the UE is to communicate over a session, like a PDU session, the session having associated therewith a current Quality of Service, QoS, profile, the current QoS profile selected form a plurality of different QoS profiles associated with the session, may have, in case of a handover, HO, from the source base station to the target base station, the steps of: obtaining the subset or all of the plurality of QoS profiles for the session or information indicating the subset or all of the plurality of QoS profiles for the session, and selecting a new or admitted QoS profile for the session the target base station is to provide, the new or admitted QoS profile being the same as or being different from the current or source QoS profile provided by the source base station before the HO.

Another embodiment may have a non-transitory digital storage medium having stored thereon a computer program for performing the above inventive methods when the computer program is run by a computer.

BRIEF DESCRIPTION OF THE DRAWINGS

Embodiments of the present invention are now described in further detail with reference to the accompanying drawings.

DETAILED DESCRIPTION OF THE INVENTION

Embodiments of the present invention are now described in more detail with reference to the accompanying drawings in which the same or similar elements have the same reference signs assigned.

Figure 1A:
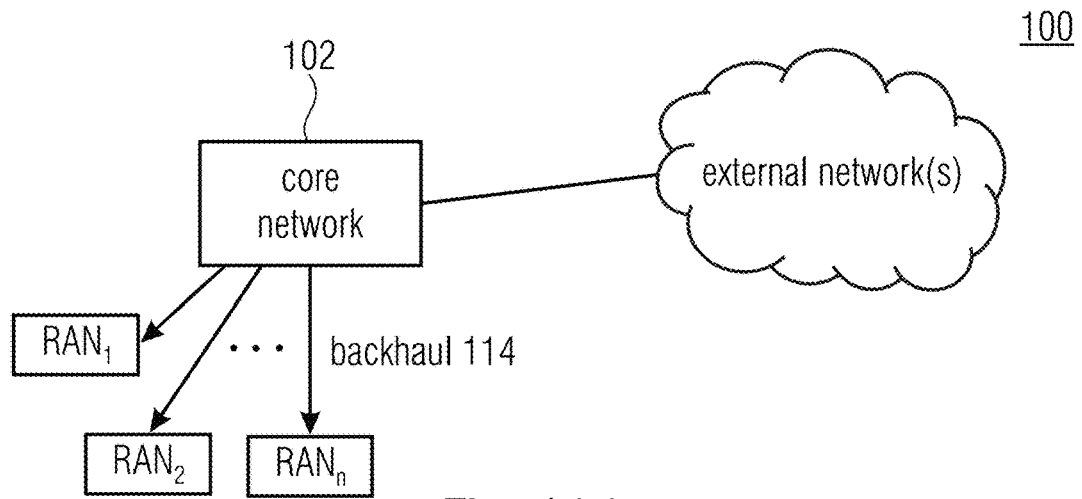
FIG. 1 shows a schematic representation of an example of a wireless communication system.
Figure 1B:
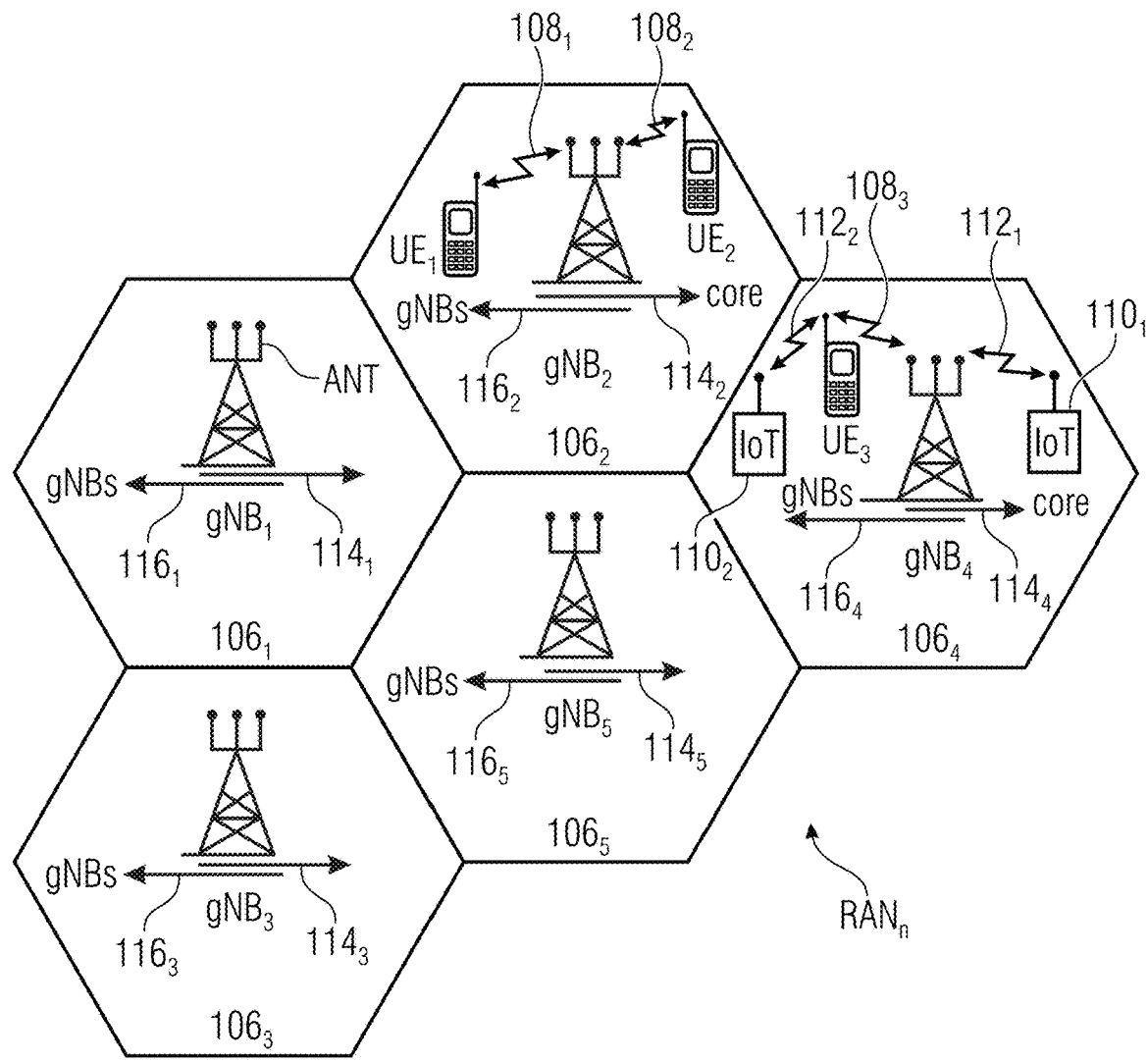
Figure 2:
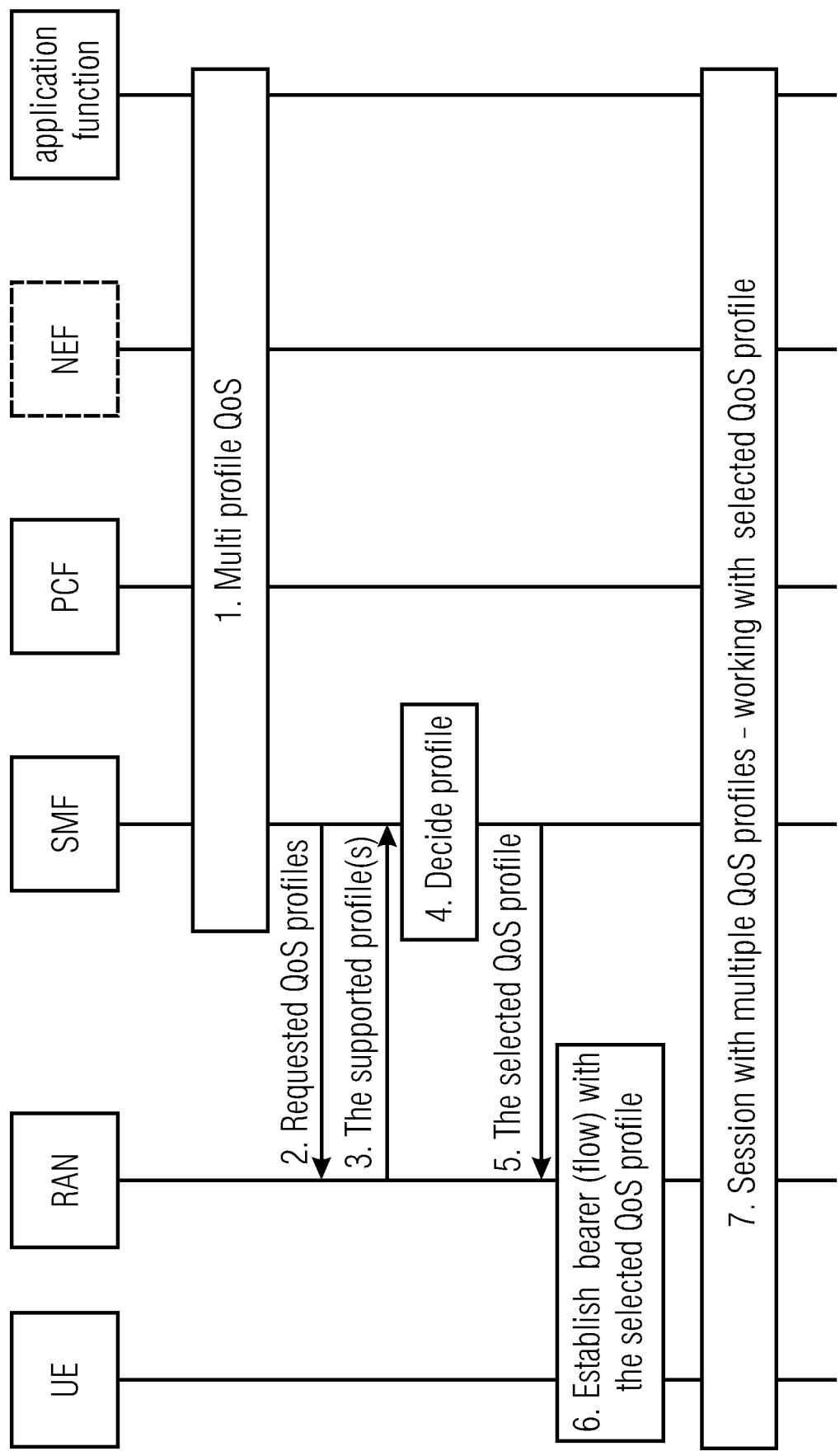
FIG. 2 illustrates an example for establishing a session with multiple QoS profiles.

In a wireless communication system as described, for example, above with reference to FIG. 1, a user device, UE, may run a certain application. When running such an application, the user device may communicate over a session, like a protocol data unit, PDU, session. Such a session may be associated with multiple QoS profiles. The network selects one (or more) of the QoS profile(s). A QoS bearer supporting the selected QoS profile(s) may be established by a procedure as it is described, for example, in reference [1], and the bearer supports/handles the selected ones for the time being. FIG. 2 illustrates an example for establishing a session associated with multiple QoS profiles in accordance with reference [1]. FIG. 2 illustrates the respective system or network entities of a wireless communication system, like a system as described above with reference to FIG. 1, namely the user device, UE, the radio access network, RAN including the above-described base stations, and several elements of the core network, for example the session management function, SMF, the policy control function, PCF, the network exposure function, NEF, and the application function, AF.

The application function may negotiate and request a PDU session associated with a plurality of QoS profiles, for example a main QoS profile and several alternative QoS profiles. A QoS profile may include one or more QoS parameters or metrics. The QoS parameters or metrics may include one or more of a data rate, like a peak data rate or an average data rate,
a quota or specific quantity of data,
a bust size,
a latency,
a delay,
a jitter,
a reliability,
a bit error rate, BER, requirement,
a packet data rate, PER, requirement,
a packet loss,
a goodput indicating, e.g., an amount of valid data received, i.e., data that may be decoded correctly and may be validated by a cyclic redundancy checksum, CRC,
a priority,
a 5G QoS identifier, 5QI.

The latency and delay mentioned above may be used interchangeably, however, there may exist a difference, namely delay refers to the amount of time it takes for the first bit to travel over a link between sender and receiver, whereas latency refers to the total amount of time it takes to send an entire message.

The plurality of QoS profiles associated with the session may include a first QoS profile and one or more second QoS profiles. The first QoS profile may be the QoS profile for the session that is most preferred, which is also referred to as the above-mentioned main QoS profile. The first or main QoS profile may provide, when running the application, the most preferred or highest QoS for the application. The two or more second QoS profiles, also referred to as the above-mentioned alternative QoS profiles, are QoS profiles for the session that are less preferred than the first QoS profile. In accordance with examples, the one or more second or alternative QoS profiles may have decreasing preferences for the session.

In FIG. 2, the application function negotiates and requests the PDU session with the plurality of QoS profiles "1.". The plurality of QoS profiles may include, as mentioned above, the main profile and several alternative QoS profiles. Once the multiple profile QoS session is determined, the SMF requests "2." from the radio access network the QoS profiles the RAN is capable to support. The RAN returns "3." to the SMF the one or more supported profiles from the plurality of QoS profiles for the session, and the SMF decides "4." which profile from the plurality of QoS profiles is to be used and signals "5." the selected QoS profile to the RAN. Responsive to the selected QoS profile, the RAN establishes "6." a bearer flow to the UE using the selected QoS profile. Once the bearer with the selected QoS profile is established, the session having associated therewith the multiple QoS profiles works "7." with the selected QoS profile.

The wireless communication system or network tries to provide the main QoS profile, however, in case the RAN is not capable of providing the main QoS profile, the RAN, as indicated at "3." may respond with one or more of the alternative QoS profiles it may support, and the SMF may pick one of the profiles and commands the RAN to establish the bearer that supports the QoS profile, as indicated at "4." to "6." in FIG. 2.

The preference of a QoS profile, i.e., whether a QoS profile is a main profile or the most preferred profile or whether the QoS profile has a preference less than the main QoS profile may be decided by the application, for example the application function, and/or by the user device, UE. The decision about the preference may use one or a combination of more than one of the above QoS parameters or metrics, for example by applying a cost function. The QoS profile may also be decided by other network entities, for example, by the base station or other core network entities, like the SMF in the 5G core network, 5G CN, or the mobility management entity, MME, in EPC (EPC=evolved packet core) or in any other core network entity such as a V2X application server or a media server. Also, the QoS preference may be decided over the top, OTT, by another entity attached to the UE via, for example, the Internet.

During the session having associated therewith multiple QoS profiles which currently works with a particular QoS profile selected in a way as described above with reference to FIG. 2, the circumstances in the network may change, for example certain events may occur, like a change in the network conditions or network capabilities, or the occurrence of a handover or a conditional handover (CHO), so that the selected QoS profile that is currently used for the session, may no longer be the most preferred QoS profile, or the network may be able to provide a QoS profile that is more preferred than current one, or the network may not be able to continue providing current QoS profile. In other words, there may be situations during the session in which the currently used QoS profile is no longer the most preferred one by the system, for example, because the RAN may not be in a position to support the selected QoS profile anymore or because it is determined that a more preferred QoS profile may be employed.

The present invention provides improvements and enhancements in the wireless communication system or network addressing the above-described issues with regard to the QoS profile to be used in case of changing situations within the wireless communication system or network. Embodiments of the present invention provide an approach allowing to determine within the system or network a new QoS profile that may be used as a new QoS profile, e.g., a QoS profile that may replace a current QoS profile. For example, a more preferred or less preferred QoS profile may be selected to be used for the session, and the new QoS profile is selected from some or all of the plurality of QoS profiles associated with the session. The newly selected QoS profile may also be the same as the current profile. The selection of the new QoS profile form some or all of the plurality of QoS profiles associated with the session may be performed in case of a certain event that is recognized within the system or network, for example in case the network conditions or network capabilities change, or in case of a handover event or a conditional handover event.

Figure 3:
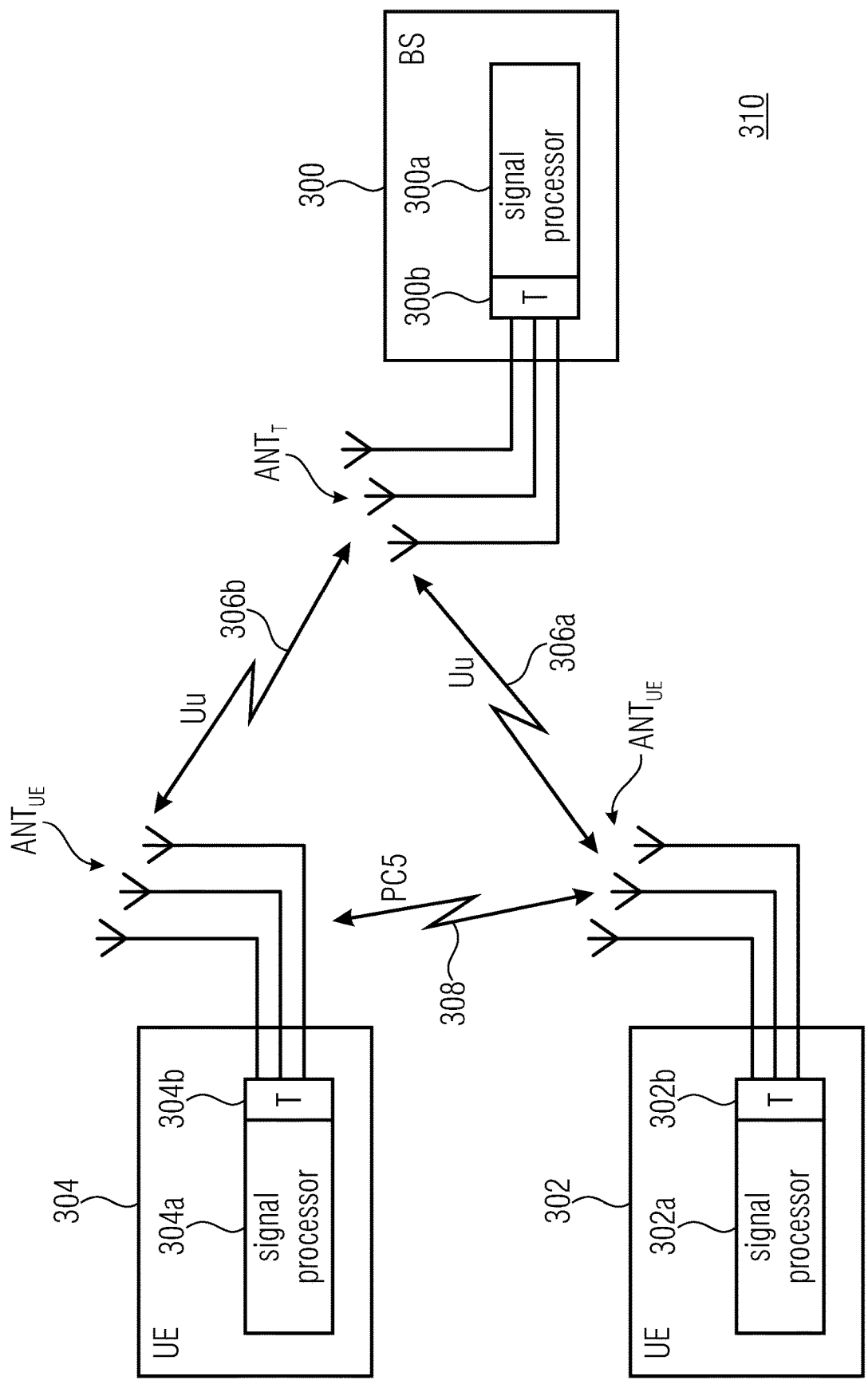
FIG. 3 is a schematic representation of a wireless communication system including a transmitter, like a base station, and one or more receivers, like user devices, UEs.

The present invention provides improvements and enhancements in the wireless communication system addressing the above described problems. Embodiments of the present invention may be implemented in a wireless communication system as depicted in FIG. 1 including base stations and users, like mobile terminals or IoT devices. FIG. 3 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 3, the one or more UEs 302, 304 and the base stations 300 may operate in accordance with the inventive teachings described herein.

Wireless Communication System

Embodiments of the present invention provide a wireless communication system, comprising:
  one or more base stations, and
  one or more user devices, UEs,
    wherein, when running a certain application, the UE is to communicate over a session, like a PDU session, the session having associated therewith a current Quality of Service, QoS, profile, the current QoS profile selected form a plurality of different QoS profiles associated with the session, and
    wherein, in case of a certain event, the wireless communication system is to replace the current QoS profile for the session by a new QoS profile for the session, the new QoS profile selected from a subset or all of the plurality of different QoS profiles associated with the session and/or one or more QoS profiles not yet associated with the session.

In accordance with embodiments, a QoS profile includes one or more QoS parameters or metrics, the one or more QoS parameters or metrics including one or more of:
  a data rate,
  a peak data rate or an average data rate,
  a quota or specific quantity of data,
  a burst size,
  a latency,
  a delay,
  a jitter,
  a reliability,
  a bit error rate (BER) or packet data rate (PER) requirement,
  a packet loss,
  a goodput,
  a priority,
  a 5G QoS Identifier, 5QI.

In accordance with embodiments, the plurality of QoS profiles associated with the session includes a first QoS profile and one or more second QoS profiles, and the first QoS profile is a most preferred QoS profile for the session, and the one or more second QoS profiles are less preferred QoS profiles for the session than the first QoS profile.

In accordance with embodiments, the one or more second QoS profiles have decreasing preferences for the session.

In accordance with embodiments, the preference of a QoS profile is decided using one or a combination of more than one of the QoS parameters or metrics, e.g., by applying a cost function, and the preference of a QoS profile is decided by
- the application, and/or
- the UE, and/or
- one or more core network entities of the wireless communication system, and/or
- over-the-top, OTT, by another entity attached to the UE, e.g., via the internet.

In accordance with embodiments, the certain event includes one or more of the following:
- a change in one or more network conditions, e.g., additional or less resources becoming available for serving the UE, or by means of carrier aggregation, CA, or dual connectivity, DC, becoming available or being no longer available for serving the UE, or changing channel conditions,
- a handover, HO, from a serving or source base station to a target base station,
- a conditional handover, CHO, from a serving or source base station to a target base station.

In accordance with embodiments, the UE is served by a serving base station, and, in case of a change of the network conditions, the wireless communication system, e.g., the serving base station or one or more core network entities of the wireless communication system, is to determine from the new QoS profile the serving base station is to provide.

In accordance with embodiments, in case the serving base station is to determine the new QoS profile, the serving base station is to
- obtain the subset or all of the plurality of QoS profiles for the session directly or indirectly, e.g., via a relay device, from the UE or from a core network of the wireless communication system or over-the-top, OTT, from another entity attached to the UE, e.g., via the internet, and/or
- obtain information indicating the subset or all of the plurality of QoS profiles for the session directly or indirectly, e.g., via a relay device, from the UE or from a core network of the wireless communication system or over-the-top, OTT, from another entity attached to the UE, e.g., via the internet, like an index pointing to a certain QoS profile, and/or
- store the subset or all of the plurality of QoS profiles for the session, and/or
- store information indicating the subset or all of the plurality of QoS profiles for the session, like an index pointing to a certain QoS profile.

In accordance with embodiments, the serving base station is to include into a request, e.g., a measurement request to the UE, a request for the subset or all of the plurality of QoS profiles, and the UE is to include into a report, e.g., a measurement report for the serving base station, the requested QoS profiles or information indicating the requested QoS profiles.

In accordance with embodiments, the subset of the plurality of different QoS profiles may include, for example,
- one or more QoS profiles having a preference less than the current profile are obtained, e.g., in case of a downgrade situation,
- one or more QoS profiles having a preference higher than the current profile are obtained, like the top-n QoS profiles, e.g., in case of an upgrade situation,
- one or more QoS profiles including one or more QoS parameters or metrics having a value fulfilling a certain criterium, e.g., a latency lower or higher than a latency threshold or a data rate lower or higher than a data rate threshold or within a certain range.

In accordance with embodiments, the serving base station is to provide the new QoS profile or information indicating the new QoS profile to the UE, or the UE is to request from the serving base station the new QoS profile or information indicating the new QoS profile.

In accordance with embodiments, the UE is served by a serving base station, and, in case of a handover, HO, from the serving or source base station to a target base station, the wireless communication system, e.g., the target base station or one or more core network entities of the wireless communication system, is to determine the new or admitted QoS profile the target base station is to provide, the new or admitted QoS profile being the same as or being different from the current or source QoS profile provided by the source base station before the HO.

In accordance with embodiments, after the HO is completed, the target base station is to provide the admitted QoS profile for the session, the admitted QoS profile being different from the current or source QoS profile provided by the source base station before the HO, e.g., a QoS profile having a higher preference or a lower preference than the source QoS profile.

In accordance with embodiments, during the HO, the source base station is to do one or more of
- obtain the subset or all of the plurality of QoS profiles for the session or information indicating the subset or all of the plurality of QoS profiles for the session from the UE or from a core network of the wireless communication system or from a memory at the source base station or over-the-top, OTT, from another entity attached to the UE, e.g., via the internet,
- include the obtained QoS profiles or the obtained information into a HO request, and
- send the HO request including the obtained QoS profiles or the obtained information to the target base station.

In accordance with embodiments, the source base station is to include into a request, e.g., a measurement request to the UE, a request for the subset or all of the plurality of QoS profiles, and the UE is to include into a report, e.g., a measurement report for the source base station, the requested QoS profiles or information indicating the requested QoS profiles.

In accordance with embodiments, during the HO, the target base station is to obtain the subset or all of the plurality of QoS profiles for the session or information indicating the subset or all of the plurality of QoS profiles for the session from one or more of:
- the application, and/or
- the UE, and/or
- one or more core network entities of the wireless communication system, and/or
- over-the-top, OTT, by another entity attached to the UE, e.g., via the internet.

In accordance with embodiments, the subset of the plurality of different QoS profiles may include, for example, one or more QoS profiles having a preference less than the source profile are obtained, e.g., in case of a downgrade situation, one or more QoS profiles having a preference higher than the source profile are obtained, like the top-n QoS profiles, e.g., in case of an upgrade situation, one or more QoS profiles including one or more QoS parameters or metrics having a value fulfilling a certain criterium, e.g., a latency lower or higher than a latency threshold or a data rate lower or higher than a data rate threshold or within a certain range.

In accordance with embodiments, during the HO, the target base station is to, e.g., in case the new or admitted QoS profile is different from the current or source QoS profile provided by the source base station before the HO, include the admitted QoS profile or the information indicating the admitted QoS profile into a HO response, and send to the source base station the HO response.

In accordance with embodiments, during or after the HO, the source base station is to provide the QoS profile admitted by target base station or the information indicating the QoS profile admitted by target base station to the UE, e.g., in case the new or admitted QoS profile is different from the current or source QoS profile provided by the source base station before the HO.

In accordance with embodiments, when switching to the target base station, the UE is to request from the target base station the admitted QoS profile or the information indicating the admitted QoS profile.

In accordance with embodiments, the HO is a conditional handover, CHO.

In accordance with embodiments, two or more target base stations are to determine respective new or admitted QoS profiles each target base station is capable to provide, and in case a conditional handover condition is met, the UE is to switch to the target base station providing the more preferred admitted QoS profile.

In accordance with embodiments, the one or more UEs comprise one or more of a mobile terminal, or stationary terminal, or cellular IoT-UE, or vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, and/or the one or more base stations comprise one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

In accordance with embodiments, the UE is configured to report the subset or all of the plurality of QoS profiles by periodically sending the subset or all of the plurality of QoS profiles or the information indicating the QoS profiles, or sending the subset or all of the plurality of QoS profiles or the information indicating the QoS profiles responsive to a triggered event, e.g., in case a measurement exceeds a certain threshold, or responsive to a beam failure event, or responsive to a certain change in the channel conditions.

In accordance with embodiments, the wireless communication system is to apply the new QoS profile at a certain time, e.g., responsive to the certain event of to a determination that the certain event is likely to occur at a certain time, for a certain duration, before the wireless communication system falls back to a current QoS profile.

User Device

Embodiments of the present invention provide a user device, UE, for a wireless communication system, wherein the UE is served by a serving base station and, when running a certain application, the UE is to communicate over a session, like a PDU session, the session having associated therewith a current Quality of Service, QoS, profile, the current QoS profile selected form a plurality of different QoS profiles associated with the session.

In accordance with embodiments, in case of a certain event, the UE is to provide to the serving base station the subset or all of the plurality of QoS profiles for the session or information indicating the subset or all of the plurality of QoS profiles for the session so as to allow the serving base station to replace the current QoS profile for the session by a new QoS profile for the session, the new QoS profile selected form the subset or all of the plurality of different QoS profiles associated with the session.

In accordance with embodiments, in case of the certain event is a handover, HO, or a conditional handover, CHO, from the serving or source base station to a target base station, the UE is to provide to the source base station and/or to the target base station the subset or all of the plurality of QoS profiles for the session or information indicating the subset or all of the plurality of QoS profiles for the session so as to allow the target base station to replace the current QoS profile for the session by the new or admitted QoS profile for the session.

In accordance with embodiments, the UE is to receive from the source base station a request, e.g., a measurement request including a request for the subset or all of the plurality of QoS profiles, and include the requested QoS profiles or information indicating the requested QoS profiles into a report, e.g., a measurement report for the source base station, and/or provide to the source base station, responsive to a handover trigger, a report including the subset or all of the plurality of QoS profiles for the session or information indicating the subset or all of the plurality of QoS profiles for the session.

In accordance with embodiments, the UE is configured to report the subset or all of the plurality of QoS profiles by periodically sending the subset or all of the plurality of QoS profiles or the information indicating the QoS profiles, or sending the subset or all of the plurality of QoS profiles or the information indicating the QoS profiles responsive to a triggered event, e.g., in case a measurement exceeds a certain threshold, or responsive to a beam failure event, or responsive to a certain change in the channel conditions.

In accordance with embodiments, the UE is to
receive, prior or during or after the HO, from the source base station and/or from the target base station the QoS profile admitted by the target base station or information indicating the QoS profile admitted by the target base station, or
request from the target base station, after switching to the target base station, the QoS profile admitted by the target base station or information indicating the QoS profile admitted by the target base station.

In accordance with embodiments, wherein
in case of a conditional handover, CHO, the UE is to provide the subset or all of the plurality of QoS profiles for the session or information indicating the subset or all of the plurality of QoS profiles for the session to two or more target base stations so as to allow the target base stations to determine respective new or admitted QoS profiles each target base station is capable to provide, and
in case a conditional handover condition is met, the UE is to switch to the target base station providing the more preferred admitted QoS profile.

In accordance with embodiments, the user device is to receive from the wireless communication system an indication that the new QoS profile is to be applied at a certain time, e.g., responsive to the certain event of to a determination that the certain event is likely to occur at a certain time, for a certain duration, before the wireless communication system falls back to the current QoS profile.

Base Station

Embodiments of the present invention provide a base station for wireless communication system, wherein
the base station is to serve a user device, UE, of the wireless communication system, the UE, when running a certain application, communicating over a session, like a PDU session, the session having associated therewith a current Quality of Service, QoS, profile, the current QoS profile selected form a plurality of different QoS profiles associated with the session, and
wherein, in case of a certain event, the base station is to replace the current QoS profile for the session by a new QoS profile for the session, the new QoS profile selected form the subset or all of the plurality of different QoS profiles associated with the session and/or one or more QoS profiles not yet associated with the session.

In accordance with embodiments, the base station is to
obtain the subset or all of the plurality of QoS profiles for the session from the UE or from a core network of the wireless communication system or over-the-top, OTT, from another entity attached to the UE, e.g., via the internet, and/or
obtain information indicating the subset or all of the plurality of QoS profiles for the session from the UE or from a core network of the wireless communication system or over-the-top, OTT, from another entity attached to the UE, e.g., via the internet, like an index pointing to a certain QoS profile, and/or
store the subset or all of the plurality of QoS profiles for the session, and/or
store information indicating the subset or all of the plurality of QoS profiles for the session, like an index pointing to a certain QoS profile.

In accordance with embodiments, in case of the certain event is a handover, HO, or a conditional handover, CHO, from the base station to a target base station, the base station is to provide to the target base station the subset or all of the plurality of QoS profiles for the session or information indicating the subset or all of the plurality of QoS profiles for the session so as to allow the target base station to replace the current QoS profile for the session by the new or admitted QoS profile for the session.

In accordance with embodiments, in case of a conditional handover, CHO, the base station is to provide the subset or all of the plurality of QoS profiles for the session or information indicating the subset or all of the plurality of QoS profiles for the session to two or more target base stations so as to allow the target base stations to determine respective new or admitted QoS profiles each target base station is capable to provide.

Target Base Station

Embodiments of the present invention provide a base station for wireless communication system, wherein the wireless communication system includes a UE served by a source base station, the UE, when running a certain application, the UE is to communicate over a session, like a PDU session, the session having associated therewith a current Quality of Service, QoS, profile, the current QoS profile selected form a plurality of different QoS profiles associated with the session, and
in case of a handover, HO, from the source base station to the target base station, the target base station is to
obtain the subset or all of the plurality of QoS profiles for the session or information indicating the subset or all of the plurality of QoS profiles for the session, and
select a new or admitted QoS profile for the session the target base station is to provide, the new or admitted QoS profile being the same as or being different from the current or source QoS profile provided by the source base station before the HO.

In accordance with embodiments, during the HO, the base station is to obtain the subset or all of the plurality of QoS profiles for the session or information indicating the subset or all of the plurality of QoS profiles for the session from the source base station or from a core network of the wireless communication system or from a memory at the target base station or over-the-top, OTT, from another entity attached to the UE, e.g., via the internet.

In accordance with embodiments, the base station is to provide the QoS profile admitted by the target base station or information indicating the QoS profile admitted by the target base station, e.g., in case the new or admitted QoS profile is different from the current or source QoS profile provided by the source base station before the HO,
prior or during the HO, via the source base station, or
once the UE switched to the target base station.

Methods

Embodiments of the present invention provide a method for a communication in a wireless communication system, the wireless communication system including one or more base stations, and one or more user devices, UEs, the method comprising:
when running a certain application by a UE, communicating over a session, like a PDU session, the session having associated therewith a current Quality of Service, QoS, profile, the current QoS profile selected form a plurality of different QoS profiles associated with the session, and
in case of a certain event, replacing the current QoS profile for the session by a new QoS profile for the session, the new QoS profile selected from a subset or all of the plurality of different QoS profiles associated with the session and/or one or more QoS profiles not yet associated with the session.

Embodiments of the present invention provide a method for a communication in a wireless communication system, the wireless communication system including one or more base stations, and one or more user devices, UEs, the method comprising:

serving a UE is served by a serving base station and when running a certain application by the UE, communicating over a session, like a PDU session, the session having associated therewith a current Quality of Service, QoS, profile, the current QoS profile selected form a plurality of different QoS profiles associated with the session.

Embodiments of the present invention provide a method for a communication in a wireless communication system, the wireless communication system including one or more base stations, and one or more user devices, UEs, the method comprising:

Serving, by a base station a user device, UE, of the wireless communication system, when running a certain application by the UE, communicating over a session, like a PDU session, the session having associated therewith a current Quality of Service, QoS, profile, the current QoS profile selected form a plurality of different QoS profiles associated with the session, and in case of a certain event, replacing, by the base station, the current QoS profile for the session by a new QoS profile for the session, the new QoS profile selected form the subset or all of the plurality of different QoS profiles associated with the session and/or one or more QoS profiles not yet associated with the session.

Embodiments of the present invention provide a method for a communication in a wireless communication system, the wireless communication system including a UE served by a source base station, the UE, when running a certain application, the UE is to communicate over a session, like a PDU session, the session having associated therewith a current Quality of Service, QoS, profile, the current QoS profile selected form a plurality of different QoS profiles associated with the session, the method, in case of a handover, HO, from the source base station to the target base station, comprising:

obtaining the subset or all of the plurality of QoS profiles for the session or information indicating the subset or all of the plurality of QoS profiles for the session, and selecting a new or admitted QoS profile for the session the target base station is to provide, the new or admitted QoS profile being the same as or being different from the current or source QoS profile provided by the source base station before the HO.

Computer Program Product

Embodiments of the present invention provide a computer program product comprising instructions which, when the program is executed by a computer, causes the computer to carry out one or more methods in accordance with the present invention.

Thus, embodiments or aspects of the present invention address the above-mentioned problems regarding the use of appropriate QoS profiles in case of changing network conditions by providing an approach allowing the wireless communication system or network or entities thereof to determine or select from some or all of a plurality of QoS profiles, in case of a certain event, a new QoS profile that may be the same as or that may be different from the current QoS profile provided before the certain event. In the latter case, the new QoS profile replaces a current QoS profile to be used for the session, for example, a more preferred or a less preferred profile. In accordance with embodiments, the new QoS profile may be a QoS profile selected from some or all of the plurality of QoS profiles associated with a session. In accordance with other embodiments, the new QoS profile may be a QoS profile not yet associated with the session and selected, e.g., from some or all of a plurality of QoS profiles provided by the network or system or the UE, e.g., profile provided for certain applications or services. Thus, other than in conventional approaches, in which the profiles are associated with the session from the beginning of the session and are not changing, in accordance with embodiments of the present invention one or more QoS profiles may be added or replaced or removed from the set or plurality of QoS profiles associated with the session. In other words, other than in conventional approaches, the set or plurality of QoS profiles initially associated with the session, e.g., the set or plurality of QoS profiles associated with the session when establishing the session, may be updated or dynamically adapted during session's activity or while the session is active using one or more new QoS profiles not initially associated with the session.

In the following, embodiments of the inventive approach will be described in more detail with reference to embodiments in accordance with which the new QoS profile is a QoS profile selected from some or all of the plurality of QoS profiles initially associated with the session. However, the inventive approach is equally applicable for embodiments in accordance with which the new QoS profile is a QoS profile not yet associated with the session and selected.

Figure 4A:
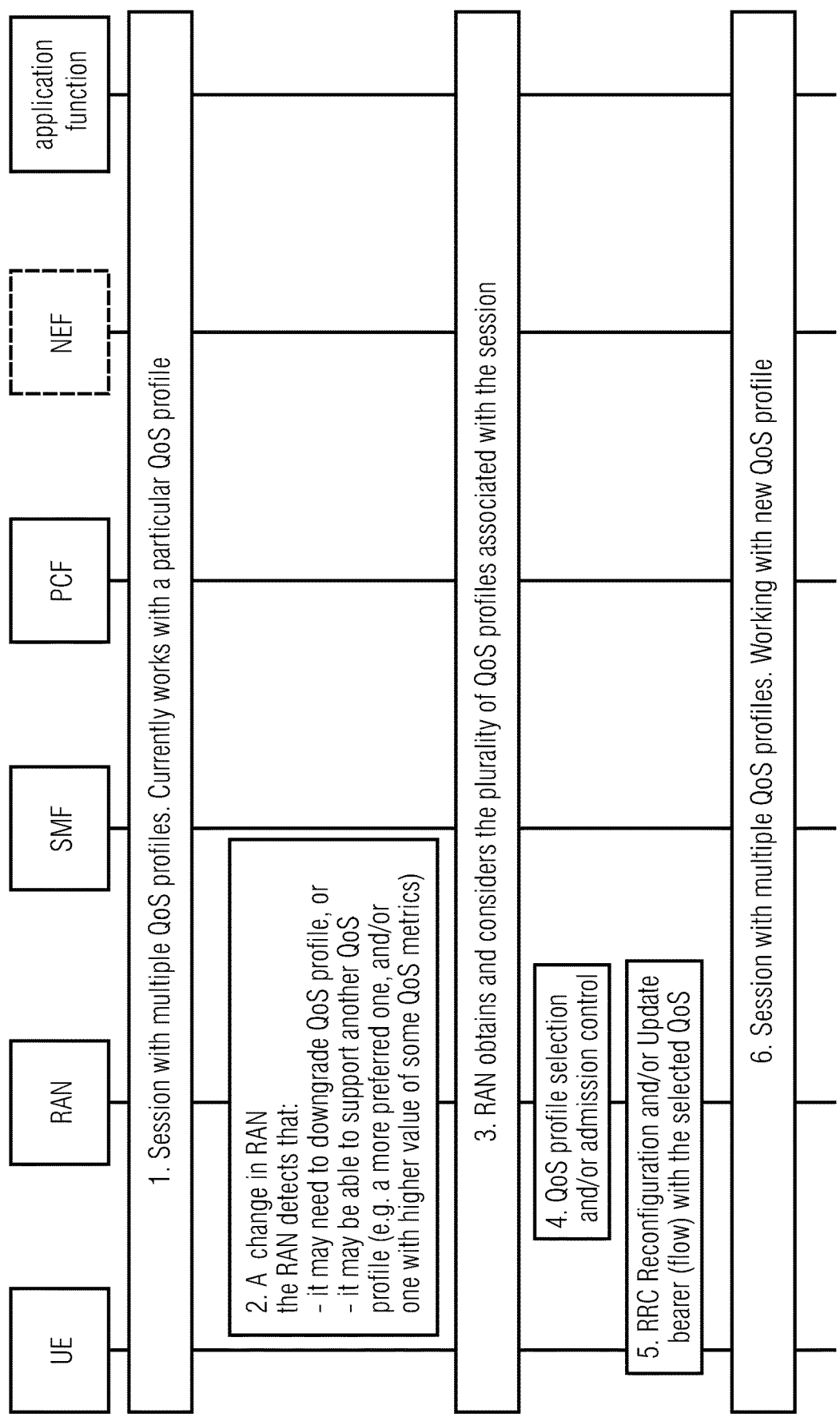
FIG. 4(a) illustrates an embodiment of the present invention replacing a currently used QoS profile for the session with a new QoS profile.

FIG. 4(a) illustrates an embodiment of the present invention replacing a currently used QoS profile for the session with a new QoS profile. In FIG. 4(a), as is indicated at "1.", it is assumed that a session having associated therewith multiple or a plurality of QoS profiles currently works with a particular QoS profile, also referred to as to the current QoS profile. The current QoS profile may be selected in a way as described above with reference to FIG. 2. During the session, for example, the RAN notes a certain event, for example, a change in one or more of the network conditions and, as is indicated at "2.", the RAN, in the depicted embodiment, detects that it is not capable to support the selected or current QoS profile any longer or detects that it is capable to support one or more of the other QoS profiles associated with the session, e.g., a more preferred QoS profile and/or a QoS profile with a higher value of some QoS metrics than the current QoS profile. For example, the change in network conditions may be due to a decrease or increase in resources being available for serving the UE. For example, in case the cell that serves the UE becomes more congested, i.e., more UEs enter the cell, more resources are used for serving all UEs within the cell so that the RAN or the base station of the cell may no longer serve the UE running the application with the current or selected QoS profile. In accordance with other embodiments, the RAN or base station may no longer be capable of proving the selected or current QoS profile for the session in case certain network capabilities are no longer available, for example in case a carrier aggregation, CA, or a dual connectivity, DC, is no longer available for serving the UE running the application. Yet another embodiment for changing network conditions may be that the channel conditions between the RAN and the UE change and become worse when compared to the time at which the current QoS profile was selected.

Responsive to detecting at "2." that the RAN is not capable to support the selected or current QoS profile anymore or that it is capable to support one or more of the other QoS profiles associated with the session, e.g., a more preferred QoS profile and/or a QoS profile with a higher value of some QoS metrics than the current QoS profile, at "3.", the RAN obtains and considers a subset of the plurality of QoS profiles or all of the QoS profiles associated with the session or available in the system/network for the application run by the UE. For example, the RAN may obtain the QoS profiles from one or more of: the UE, another bases station in the same RAN or in a different RAN, and one or more of the core network entities. At "4" the RAN performs QoS profile selection and/or admission control. For example, the RAN may determine from some or all of the QoS profiles associated with a session that the RAN is capable to support one or more of the other QoS profiles. For example, in case of the above-mentioned situations, instead of using a currently selected QoS profile a less preferred QoS profile may be employed. For example, in case the session, initially, employed the first or main QoS profile, at "1.", the RAN may detect that it is capable to support one or more of the second or alternative QoS profiles.

At "5." The UE is reconfigured, e.g., using an RRC reconfiguration via the RAN, with the selected QoS profile, or the bearer flow is updated by the RAN with the selected QoS profile so that, as is shown at "6.", the session having associated therewith the multiple QoS profiles now works with the new QoS profile.

Figure 4B:
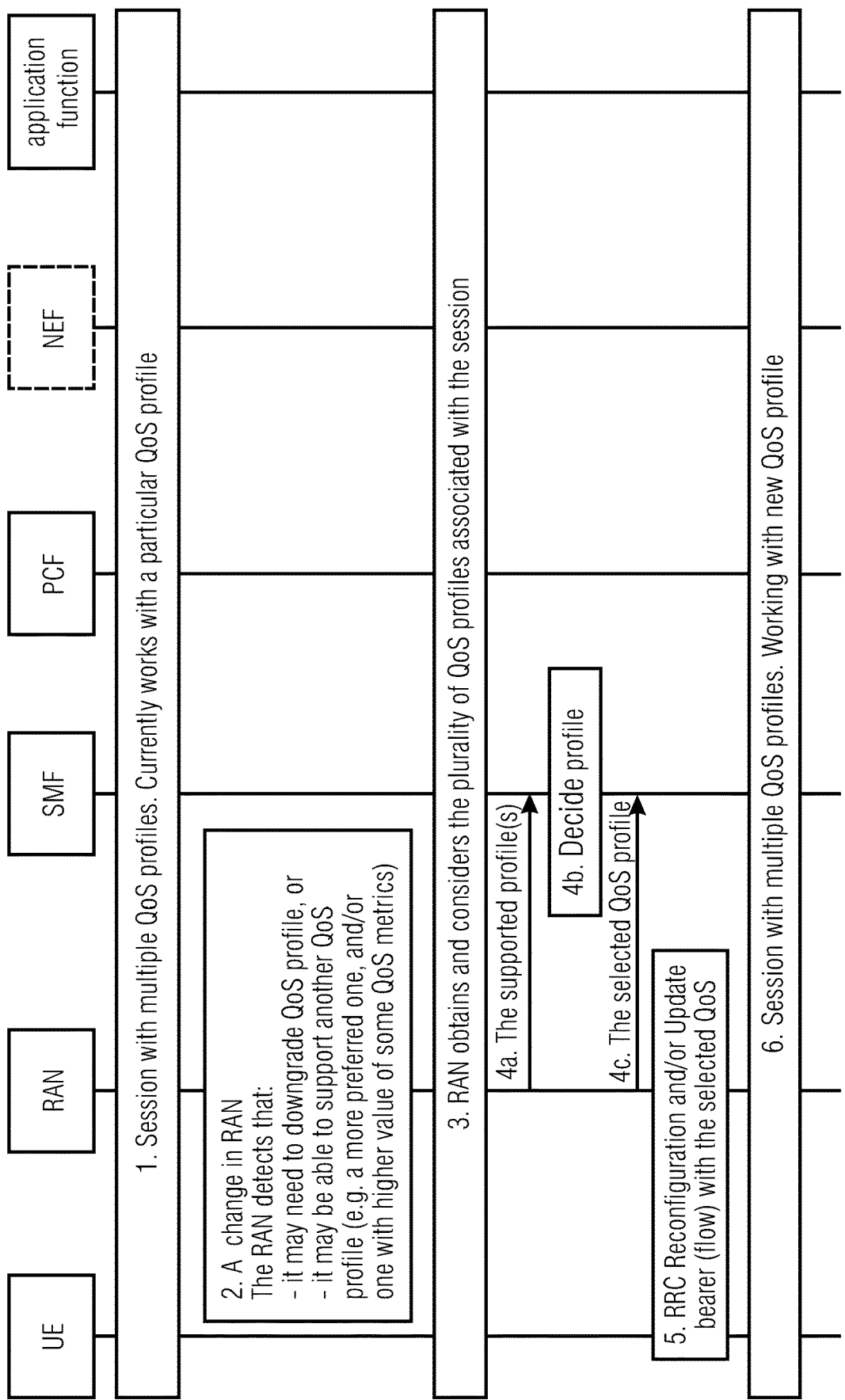
FIG. 4(b) illustrates a further embodiment of the present invention replacing a currently used QoS profile for the session with a new QoS profile obtained from the SMF or the core network.

FIG. 4(b) illustrates an embodiment of the present invention replacing a currently used QoS profile for the session with a new QoS profile obtained from the SMF and/or the core network. FIG. 4(b) corresponds to FIG. 4(a) except for "4". In accordance with the depicted embodiment the RAN may communicate at "4." the supported QoS profiles to the SMF, and the SMF picks one profile and commands the RAN to update the bearer. More specifically, once the RAN obtained and considered at "3" the subset of the plurality of QoS profiles or all of the QoS profiles associated with the session or available in the system/network for the application run by the UE, at "4a.", the RAN signals to the SMF the one or more supported profiles. The SMF decides at "4b." which of the supported QoS profiles is to be used and signals at "4c." the selected QoS profile to the RAN.

The embodiments of FIG. 4(a) and FIG. 4(b) concern a decrease and an increase of the channel conditions and an associated QoS downgrade or upgrade of the session. When considering a change of the QoS profile due to an improvement in the network conditions, i.e., a QoS upgrade of the session may be performed, at "2.". In FIG. 4(a) and FIG. 4(b), the RAN may detect that additional resources for serving the UE become available. For example, users may leave the cell serving the UE, for example one or more users may leave a full or congested cell thereby freeing resources that become available for serving the remaining users in the cell. This allows the RAN or base station to serve the UE with a better or more preferred QoS profile. This, for example, may be triggered by the BS or the UE. In accordance with other embodiments, the network capabilities may improve, for example, for serving the UE carrier aggregation or dual connectivity may become available thereby allowing the RAN to provide for the session a better or more preferred QoS profile. Yet another embodiment may be that when compared to the initial establishment of the bearer flow as indicated in FIG. 2, the channel condition may improve or become better when compared to the initial channel condition, so that responsive to the improved or better channel condition the RAN is capable to provide a better or more preferred QoS profile. In such embodiments, at "2." in FIG. 4(a), the RAN may detect that it may support QoS profiles that are better or more preferred than the currently used profile, and at "3." the RAN obtains and considers a subset of the plurality of QoS profiles or all of the QoS profiles associated with the session or available in the system/network for the application run by the UE.

In the embodiment of FIG. 4(a), the RAN, for example, the base station, determines a change in the network conditions and, further, detects or determines one or more of potential new QoS profiles to be used. In accordance with embodiments, the RAN or the base station serving the UE may obtain some or all of the plurality of QoS profiles for the session, for example from the UE, or from the core network (see FIG. 4(b)), or from another base station. In accordance with other embodiments some or all of the plurality of QoS profiles for the session may be obtained from the UE via a relay. For example in case the UE is a wearable device, like a smart watch or the like, that is coupled to the RAN or base station via a mobile phone, the QoS profiles for the session may be obtained by the serving base station via the relay. In other words, some or all of the plurality of QoS profiles for the session may be obtained by the serving base station directly from the UE that is served or indirectly, via a relay.

In accordance with other embodiments, rather than obtaining some or all of the plurality of QoS profiles, only information indicating some or all of the plurality of QoS profiles may be obtained. For example, respective indices pointing to respective QoS profiles for the session may be obtained. The serving base station may store some or all of the plurality of QoS profiles for the session or the information indicating the QoS profiles.

In accordance with further embodiments, the serving base station may include a request for the QoS profiles into a measurement request to the UE, and the UE may include the requested QoS profile or the information indicating the requested QoS profiles into the measurement report that is sent or returned to the serving base station.

In accordance with embodiments of the present invention as described above, the serving base station may obtain or store all of the plurality of QoS profiles or information associated with all of the plurality of QoS profiles for the session, or it may include some of the plurality of QoS profiles, also referred to a subset of the plurality of QoS profiles. In accordance with embodiments, the subset of the plurality of different QoS profiles may include:
- one or more QoS profiles having a preference less than the current profile are obtained, e.g., in case of a downgrade situation, or
- one or more QoS profiles having a preference higher than the current profile are obtained, like the top-n QoS profiles, e.g., in case of an upgrade situation, or
- one or more QoS profiles including one or more QoS parameters or metrics having a value fulfilling a certain criterium, e.g., a latency lower or higher than a latency threshold or a data rate lower or higher than a data rate threshold or within a certain range.

In the embodiments described above with reference to FIG. 4(a) and FIG. 4(b), the RAN or base station updated the bearer with the selected QoS profile, however, in accordance with other embodiments, for example, in case also the UE becomes aware of a certain event, the UE may request from the serving base station or the RAN the new QoS profile or information indicating the QoS profile.

In the above-described embodiments, the RAN or serving base station, as described with reference to FIG. 4(a), determines from the subset or from all of the plurality of different QoS profiles associated with the session the new QoS profile, however, the present invention is not limited to such embodiments. Rather, in accordance with other embodiments, the determination which of the different QoS profiles associated with the session is to be used as the new QoS profile may be performed at any other network entity, for example, it may be performed by the UE or by one or more of the core network entities described above, e.g., the SMF as illustrated in FIG. 4(b) at "4a", "4b" and "4c".

Embodiments of the present invention address the above problems encountered in case of changing network conditions when running an application on a UE that communicates over a session having associated multiple or several different QoS profiles by allowing the wireless communication system or network to determine or select a new QoS profile from the plurality of QoS profiles that, due to a changed network condition, may be more preferred when compared to a currently used QoS profile, which provides the following advantages or improvements:

When the network is not capable to continue supporting the QoS profile for a session, it looks for a downgrade solution before dropping or disconnecting the session. Dropping the session means that the UE and/or application need to request and establish a session from the beginning.

On the other hand when the network situation improves, the network has mechanisms to upgrade the session. Otherwise the session will continue with the QoS profile that had been selected in the session establishment phase.

In the embodiments described above with reference to FIG. 4(a), the UE receives a request, for example a measurement request, from the serving base station including a request for the subset or all of the plurality of QoS profiles associated with the session so as to include into a report, for example, a measurement report, the requested QoS profiles or information indicating the requested QoS profiles to the serving base station. The present invention is not limited to embodiments providing the QoS profiles from the UE to the serving base station responsive to a respective request, like a measurement request, in a report, like the measurement report. Rather, in accordance with other embodiments, the UE may be configured by the system to report the subset or all of the plurality of QoS profiles by periodically sending the QoS profiles or the information indicating the QoS profiles, or by sending the QoS profiles or the information indicating them responsive to a certain triggered event, like a measurement result being above a certain threshold, or a beam failure event, or a certain change in a channel condition between the UE and the serving base station.

In accordance with the embodiments described above, the new QoS profile determined to be used for the session responsive to the certain event may be used until a further event is detected in response to which another new QoS profile from the plurality of QoS profiles for the session may be selected. However, the present invention is not limited to such embodiments. Rather, in accordance with other embodiments the new QoS profile determined or selected in a way as described above may be provided only temporarily or for a certain period of time. In other words, the new QoS profile may have associated therewith a timer-based validity. For example, the serving base station may inform the UE that the new QoS profile is active at one or more instances in time signaled to the UE for a certain period or duration. For example, the wireless communication system or network or entities thereof may predict that responsive to the current event a new event is likely to happen after a certain period of time, for example that a currently detected change in the network conditions is likely to return to the preceding network condition after a certain period of time or that it is likely that the UE changes back to the original serving base station at a certain time after a handover. In such a situation, the system may inform the UE about the new QoS profile to be used at a certain instance in time, for example immediately or at a time predicted at which the certain event occurs, and use it for a certain duration also predicted by the system as long as the event or situation is predicted to exist, and after that the currently QoS profile is used again. This approach is advantageous as it allows the UE to use the new QoS profile efficiently, for example to perform the downloads of data and the like. For example, when considering a situation in which a mobile user passes a 5G hotspot in a city and only has a limited voucher for this high speed service, the QoS profile allowing to make use of the high speed service may be enabled for a time and duration of passing the 5G hotspot allowing the UE to download the data using the high speed service.

The embodiments described above in detail with regard to FIG. 4(a) and FIG. 4(b) concerned certain events responsive to which a new QoS profile may be selected among the subset or among all of the plurality of QoS profiles available or associated with the session over which the UE communicates when running the application. In accordance with further embodiments of the present invention, the certain event causing a selection of a new QoS profile may not be a change in the network condition or the network capabilities as described above, but the event may be a handover event or a conditional handover event.

Figure 5:
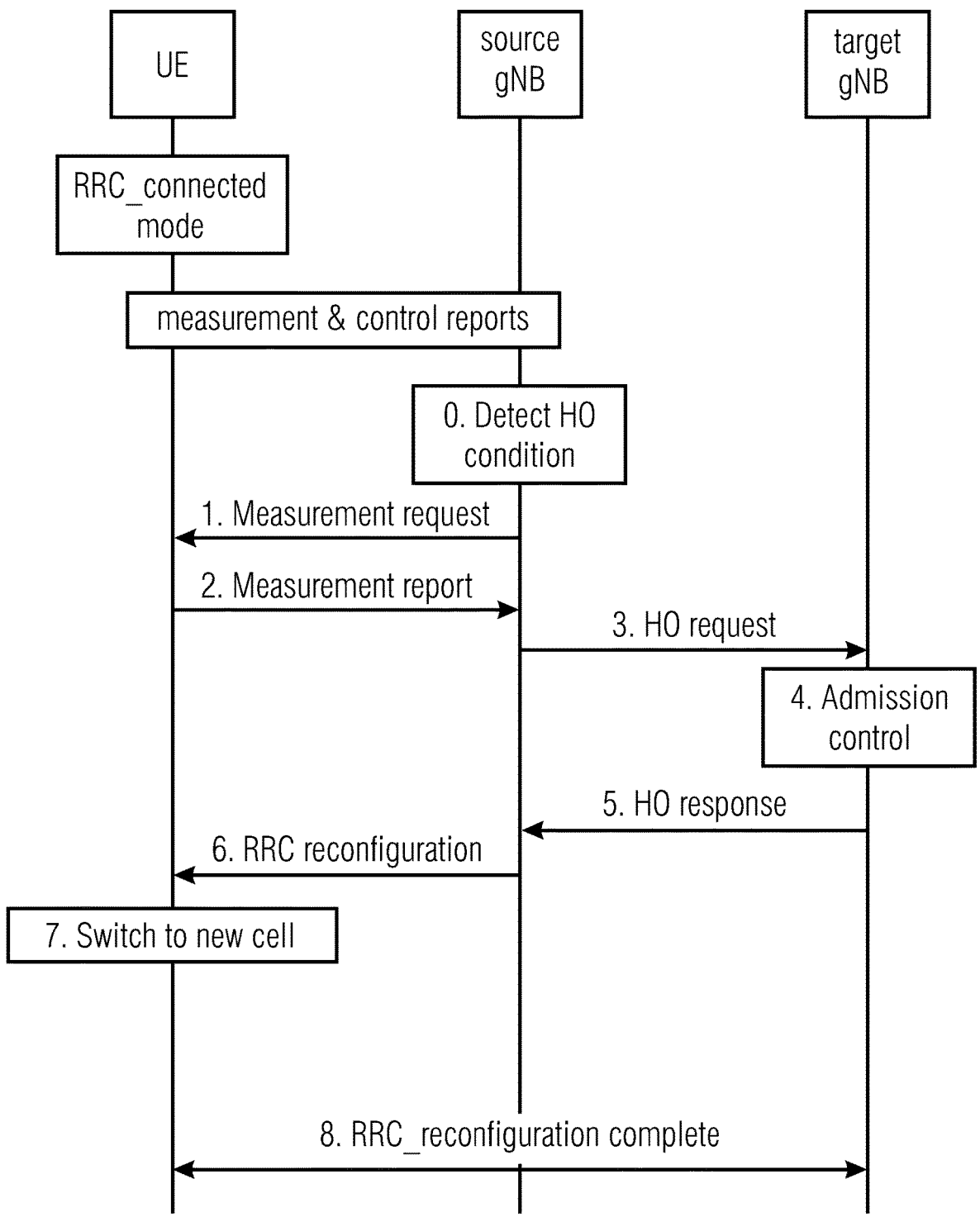
FIG. 5 illustrates a network-controlled handover from a serving or source base station or gNB to target base station or gNB.

FIG. 5 illustrates a network-controlled handover from a serving or source base station or gNB to a target base station or gNB as described, for example, in reference [2]. The UE is considered to be in the RRC_connected mode, i.e., is served by the source gNB. The UE and the source gNB exchange measurement and control reports. At "0.", the source gNB detects a handover, HO, condition responsive to which the source gNB at "1." sends a measurement request to the UE that returns at "2." the measurement report. The source gNB at "3." issues the handover request message to the target gNB for passing a transparent RRC container with the information to prepare for the handover at the target gNB. The information forwarded to the target gNB may include, among other information, the rules for mapping a current QoS flow to DRB, dedicated radio bearer, which are applied to the UE, and PDU session related information. The information may also include the UE reported measurement information including beam related information. The PDU session related information may include slice information, if supported, and the QoS flow level QoS profile.

At "4.", the target gNB performs the admission control according to the received information in the HO request, prepares the handover, and sends at "5." the handover response to the source gNB. At "6.", the source gNB sends the RRC_reconfiguration message to the UE that, at "7.", switches to the new cell or the new target gNB and signals to the target gNB at "8." that the RRC reconfiguration is complete.

Figure 6:
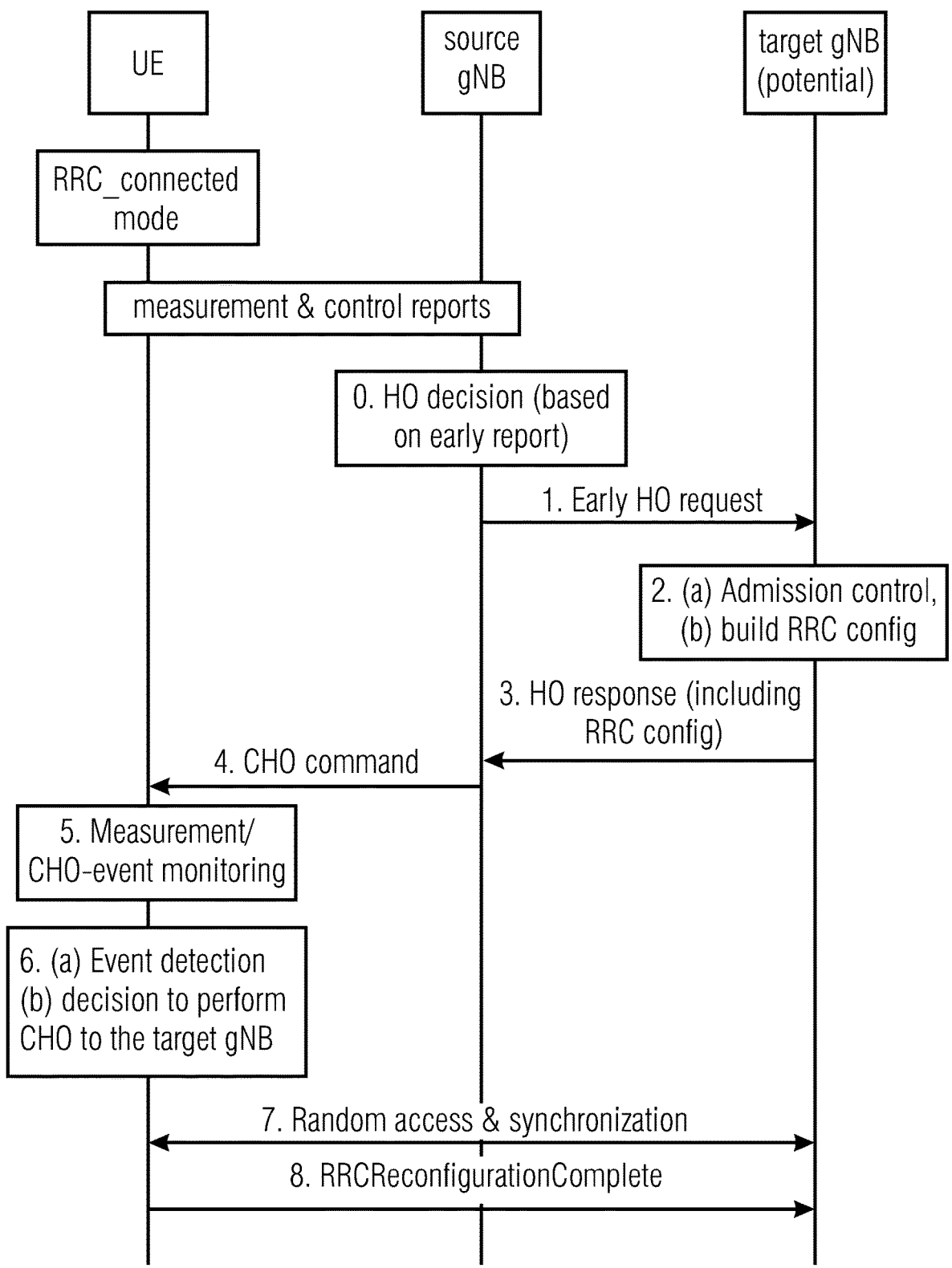
FIG. 6 illustrates a conditional handover (CHO) from a serving or source base station or gNB to a target base station or gNB.

The handover event may also be a conditional handover event, CHO event, and FIG. 6 illustrates a conditional handover from a serving or source base station or gNB to a target base station or gNB as described, for example, in references [3] and [4]. During a regular handover described above with reference to FIG. 5, due to a link degradation the measurement report provided by the UE at "2." or the RRC reconfiguration message, also referred to as to the HO command, at "6." may not reach their destination, namely the source gNB and the UE, respectively, so that the handover process may not be completed properly. The conditional handover addresses this issue by preconfiguring the UE for the handover to a potential target base station before the link to the source gNB degrades and the handover happens. FIG. 6 illustrates the conditional handover procedure as described in the above-mentioned references. Other than in FIG. 5, in FIG. 6, at "0.", a HO decision is taken by the source gNB, and at "1." an early HO request is transmitted to a potential target gNB that, at "2.", performs the admission control and builds an RRC configuration for the UE that is forwarded to the source gNB at "3." together with the HO response. The source gNB at "4." transmits the CHO command including the RRC configuration obtained from the target gNB to the UE. The UE at "5." performs measurements so as to determine as to whether a certain conditional handover event occurs. At "6.", responsive to an event detection due to the CHO event monitoring, the UE decides to perform the handover to the target gNB for which it already received the respective RRC configuration. At "7.", the random access and synchronization procedure with the new target gNB is performed and at "8." the reconfiguration complete message is sent to the target gNB. The UE may be configured with one or more events and one or more potential target gNBs and when the UE detects that the event occurred, as indicated at "6." in FIG. 6, it switches to a corresponding target gNB as indicated at "7." and "8." in FIG. 6.

In the above-described handover or conditional handover procedures, conventionally, the target base station(s) is provided with the handover information from the source gNB that includes the QoS profile currently used by the source or serving base station and that is also to be used by the target base station. The problem with this is that in case the target base station is not in a position to provide the QoS profile the target gNB does not admit the handover, i.e., the handover may fail or another target gNB needs to be determined. Another problem is that the target gNB may be in a position to provide a more preferred QoS profile, however, the target gNB is to use the QoS profile signaled by the serving base station. Embodiments of the present invention address these drawbacks encountered during a handover or a conditional handover by allowing the target gNB to select from a subset or from all of the plurality of QoS profiles associated with a session a new QoS profile to be used once the UE changed from the serving base station to the target base station. This addresses the above-mentioned drawback of a target base station not being capable of providing a current QoS profile as embodiments of the present invention allow the target gNB to select among a subset of or among all of the plurality of QoS profiles of the session also a QoS profile that is less preferred than the current profile thereby allowing the target gNB to admit the handover. Also, the issue that the target base station may be capable of providing a more preferred QoS profile is addressed as such a more preferred QoS profile may be selected as the new QoS profile.

In accordance with further embodiments, in case the target base station determines that among the subset of all of the plurality of QoS profiles there is no more preferred QoS profile than the one currently used and that the target gNB is capable of providing the currently used QoS profile, the target gNB determines or selects the current QoS profile as the new QoS profile to be used by the target base station.

Figure 7:
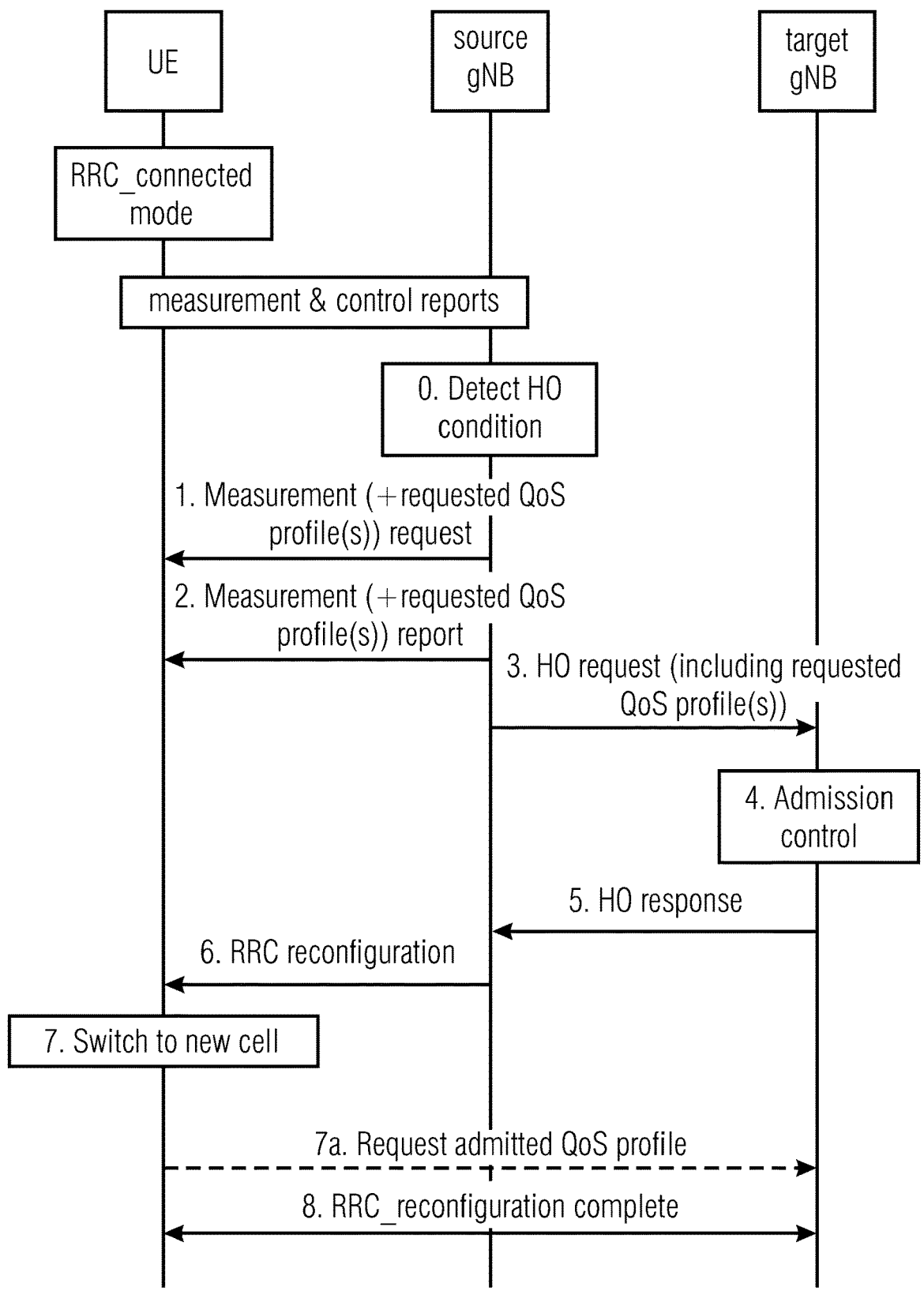
FIG. 7 illustrates an embodiment of the present invention implementing the inventive approach during a non-conditional handover procedure.

FIG. 7 illustrates an embodiment of the present invention implementing the inventive approach during a non-conditional handover procedure. Except for steps "1." to "5.", the steps illustrated in FIG. 7 basically correspond to those steps described above with reference to FIG. 5. In accordance with embodiments of the present invention, responsive to the detection of the HO condition at the source gNB at "0.", the source gNB at "1." includes into the measurement request to UE also a request for the QoS profiles associated with the session over which the UE running the application communicates. Thus, at "1." the measurement request includes the request for the QoS profiles. At "2.", responsive to the measurement request, the UE includes into the measurement report some or all of the plurality of QoS profiles, i.e., all of the plurality of QoS profiles or a subset thereof, or, in accordance with other embodiments, only an indication of the QoS profiles, like respective indices pointing to QoS profiles. The measurement report is transmitted to the source gNB that at "3." transmits the HO request into which the requested QoS profiles or the information indicating them is included. At "4." the target gNB performs the admission control taking into consideration the subset or all of the plurality of QoS profiles received or indicated in the HO request and determines, as described above, a new QoS profile the target gNB is capable to provide which is also referred to as to the QoS profile admitted by the target gNB or as the admitted QoS profile. The QoS profile admitted by the target gNB is included in the HO response at "5.", and the UE is reconfigured accordingly.

Thus, after the HO is completed, the target base station provides the admitted QoS profile for the session, and the admitted QoS profile may be different from the current or source QoS profile provided by the source base station before the handover, for example a QoS profile having a higher preference or a lower preference when compared to the source QoS profile may be employed. However, as mentioned above, in accordance with other embodiments, the target gNB may select the same QoS profile as used by the source base station.

In the embodiment described with reference to FIG. 7, the source base station obtains the subset or all of the plurality of QoS profiles for the session or information indicating the QoS profiles for the session from the UE or, in case these QoS profiles are already present at the source gNB, for example in case they were stored by the source gNB, e.g., during an earlier HO procedure or during session establishment, it may retrieve this QoS profile information from a memory at the source base station. In case of the handover process depicted in FIG. 7, the QoS profile or the obtained information is included into the HO request at "3." and sent to the target base station. In accordance with other embodiments, the QoS profiles or information about them may be requested by the source base station from the UE using a request different from a measurement request, and the UE may provide a report different from the measurement report including the requested profiles or information indicating the profiles.

In case the source gNB stores the QoS profiles of the UE or the information indicating the QoS profiles, the measurement request at "1." and the measurement report at "2." may be as in FIG. 5 or in FIG. 6, i.e., it is not necessary to include into the measurement request the request for the QoS profiles and into the measurement report the requested QoS profiles or the information about them.

In accordance with other embodiments, the source gNB may obtain the QoS profiles or the information indicating them from a core network of the wireless communication system, for example from one or more of the core network entities described above with reference to FIG. 2 that established the session with the multiple QoS profiles. For example, the QoS profiles may be obtained from the SMF or any other of the network entities indicated above. In addition to the core network entities mentioned above like the SMF in 5G core network, the profiles may be provided by the MME in EPC. Also, other core network entities or a road side unit (RSU) may provide the QoS profiles, for example a V2X application server or a media server. Also, the QoS profiles may be provided over the top, OTT, by an entity that is attached to the UE via, for example, the Internet.

In accordance with other embodiments, the UE may provide information about the QoS profiles or the QoS profiles associated with the session directly to the gNB independent from receiving a request from the source gNB. For example, the UE may be configured to report the subset or all of the plurality of QoS profiles or the information indicating the QoS profiles by periodically sending the profiles or the information or by sending the information of the profiles responsive to a certain or triggering event, for example, when performing a measurement at the UE and determining that a certain measured value is exceeding a predefined threshold, or in case of a beam failure event, or in case the UE senses a change in a channel condition on the channel between the UE and the source gNB.

Figure 8:
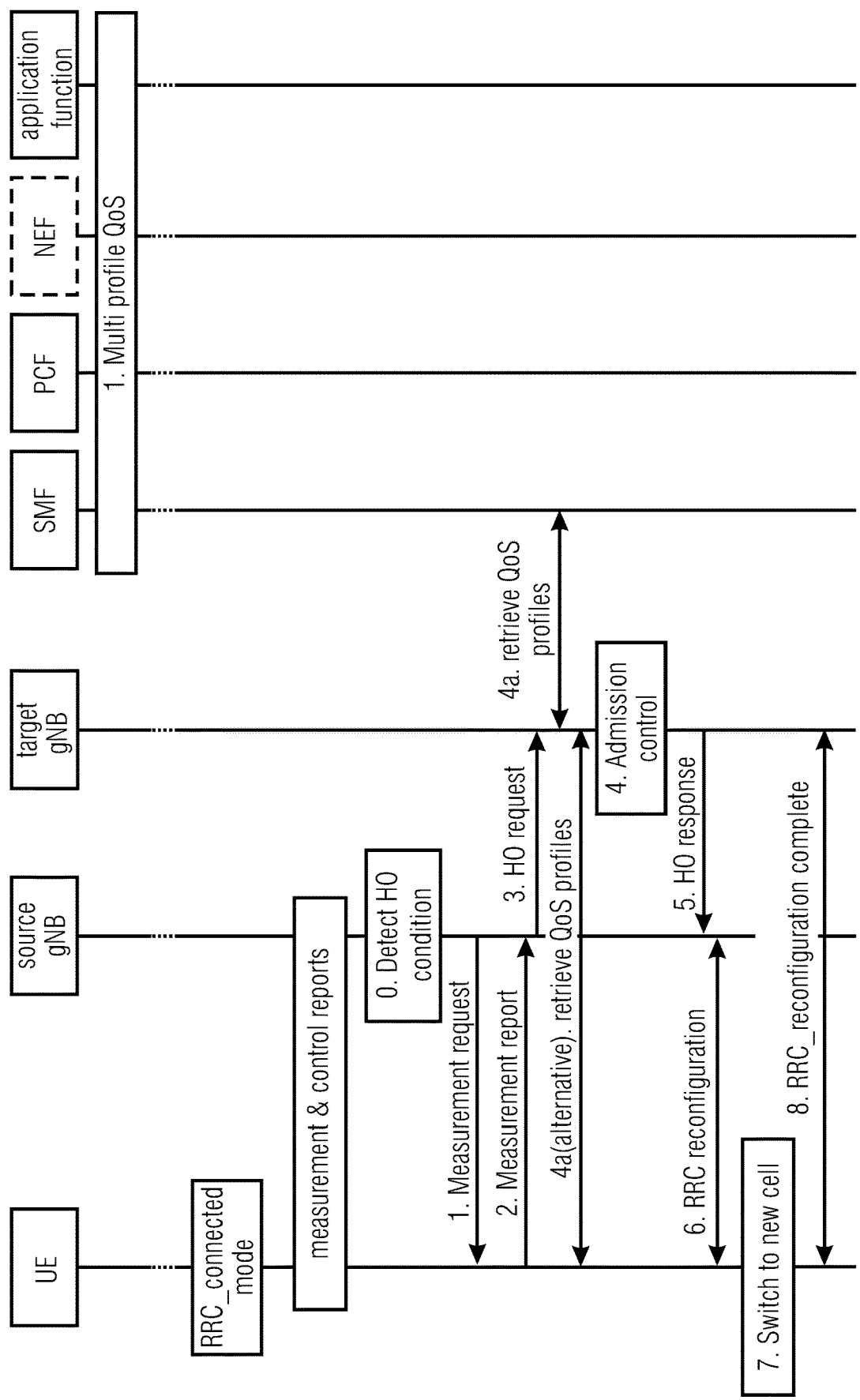
FIG. 8 illustrates an embodiment of the present invention in accordance with which a subset of or a plurality of QoS profiles is obtained by the target gNB either from the core network or from the UE.

In accordance with other embodiments of the present invention, the target gNB may obtain the subset of or the plurality of QoS profiles associated with the session from the UE or from one or more of the core network entities or from an entity attached to the UE via, for example, the Internet. FIG. 8 illustrates an embodiment in accordance with which the subset of or the plurality of QoS profiles associated with the session from which the target gNB selects a new QoS profile is obtained by the target gNB either from the core network or from the UE. When compared to FIG. 5 or FIG. 7, the handover procedure in accordance with this embodiment includes the additional steps 4a for retrieving the QoS profiles or information about them either from the SMF or from the UE. Then, in a similar way as in FIG. 7, the QoS profile admitted by the target gNB is included into the HO response at "5.".

In accordance with the embodiments described above, either the plurality of QoS profiles or information about them may be obtained at the target gNB, or a subset of the plurality of QoS profiles may be obtained. The subset of QoS profiles may include, for example, one or more of the following:
one or more QoS profiles having a preference less than the source profile are obtained, e.g., in case of a downgrade situation, or
one or more QoS profiles having a preference higher than the source profile are obtained, like the top-n QoS profiles, e.g., in case of an upgrade situation, or
one or more QoS profiles including one or more QoS parameters or metrics having a value fulfilling a certain criterion, e.g., a latency lower or higher than a latency threshold or a data rate lower or higher than a data rate threshold or within a certain range.

In accordance with the embodiments described above, the UE receives the QoS profile admitted by the target gNB via the source gNB using, for example, the RRC reconfiguration message at "6.". However, in accordance with other embodiments, the UE may obtain the QoS profile admitted by the target gNB only once the UE switches to the gNB, as is schematically indicated at "7a." in FIG. 7.

Figure 9:
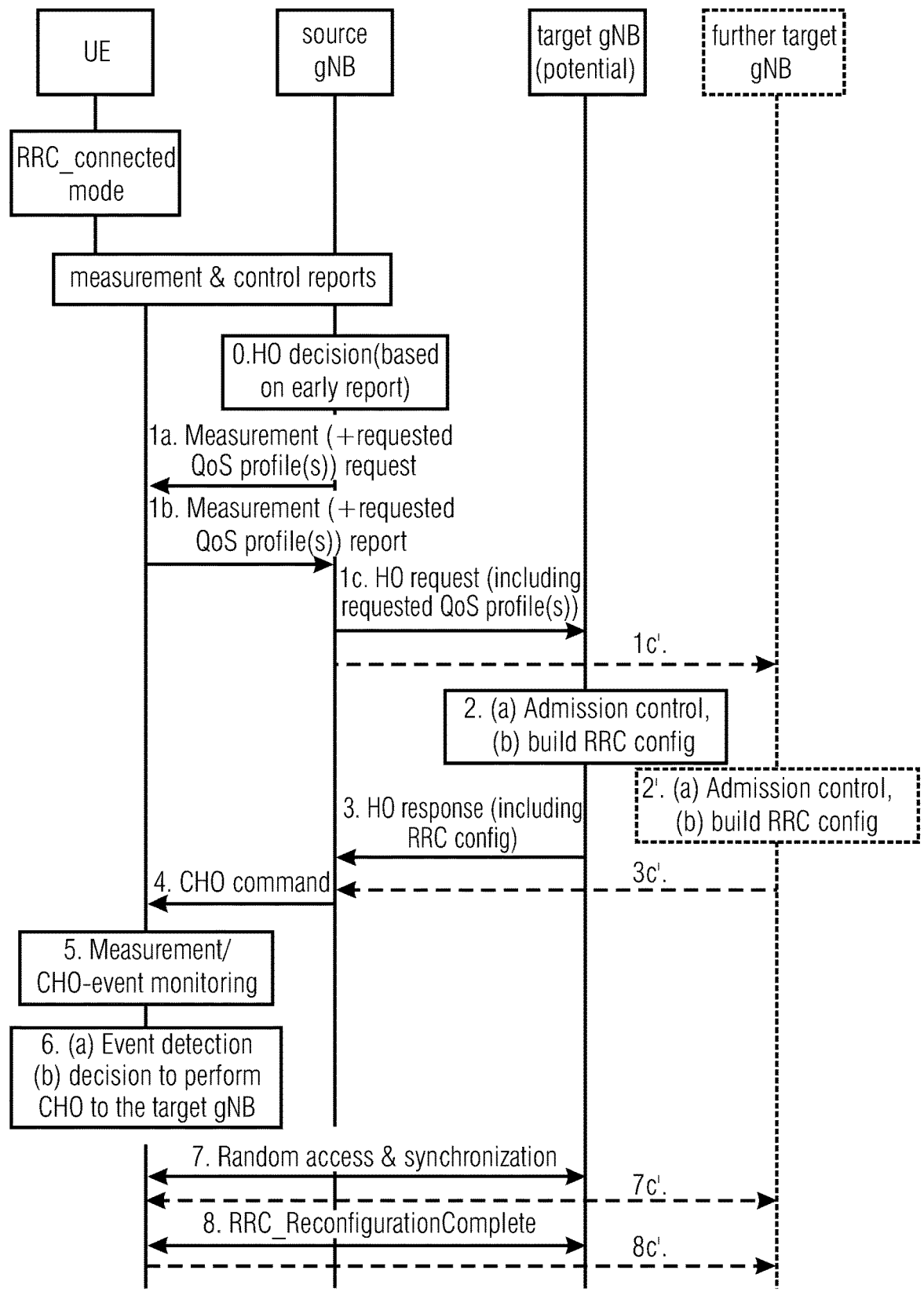
FIG. 9 illustrates an embodiment of the present invention for a conditional handover (CHO) in which the QoS profiles are obtained by the source gNB from the UE and forwarded to the one or more potential target gNB.

In accordance with further embodiments, the inventive approach may also be employed when implementing a conditional handover. FIG. 9 illustrates an embodiment for a conditional handover in which the QoS profiles are obtained by the source gNB from the UE and forwarded to the potential target gNB. FIG. 9 illustrates the procedure similar as in FIG. 6, and, initially the measurement request is sent to the UE at "1a." by the source gNB which includes a request for the QoS profiles associated with the session over which the UE communicates. At "1b." the measurement report is sent to the source gNB which includes the requested QoS profiles or information indicating these profiles. At 1c, the HO request is sent to the potential target gNB which includes the requested QoS profiles or the information. At "2.", the target gNB performs admission control which includes selecting from the QoS profiles received via the HO request a QoS profile admitted by the target gNB, and the admitted QoS profile is included into the HO response at "3." and transmitted to the UE via the CHO command at "4.". Then, in a similar way as described above with reference to FIG. 6, responsive to the handover event, the switching to the target gNB is performed by the UE.

In accordance with other embodiments, the source gNB may store the QoS profiles for the UE or it may obtain the QoS profiles or the information indicating them from the core network entities or from an external entity connected to the UE via, for example, the Internet. In case the source gNB stores the QoS profile or obtains the QoS profiles from another entity, steps 1a and 1b are not needed, and in case the QoS profiles are obtained from another entity, the respective request is sent towards the other entity and the report is received from the other entity.

In accordance with further embodiments, when considering a conditional handover as illustrated in FIG. 9, rather than providing only a single target gNB also more than one target gNB may be included into the conditional handover process. FIG. 9 schematically illustrates in dashed lines the additional target gNB that, in such embodiments, also receives at "1c'." the HO request including the QoS profiles from the UE, determines at "2'." the QoS profile admitted by the further target gNB and returns this information at "3'." to the source gNB. The source gNB includes the additional QoS profile admitted by the further target gNB into the CHO command at "4.". In such a situation, in case a conditional handover event is determined at the UE, in addition, the UE further determines which of the QoS profiles received from the target gNB and from the further target gNB is more preferred and switches to the target gNB or to the further target gNB. In other words, in case the QoS profile from the target gNB is more preferred, the switching is performed as is indicated at "7." and at "8.". On the other hand, in case the further QoS profile is preferred, the switching is performed to the further target gNB as indicated at "7'." and at "8'." in FIG. 9.

Figure 10:
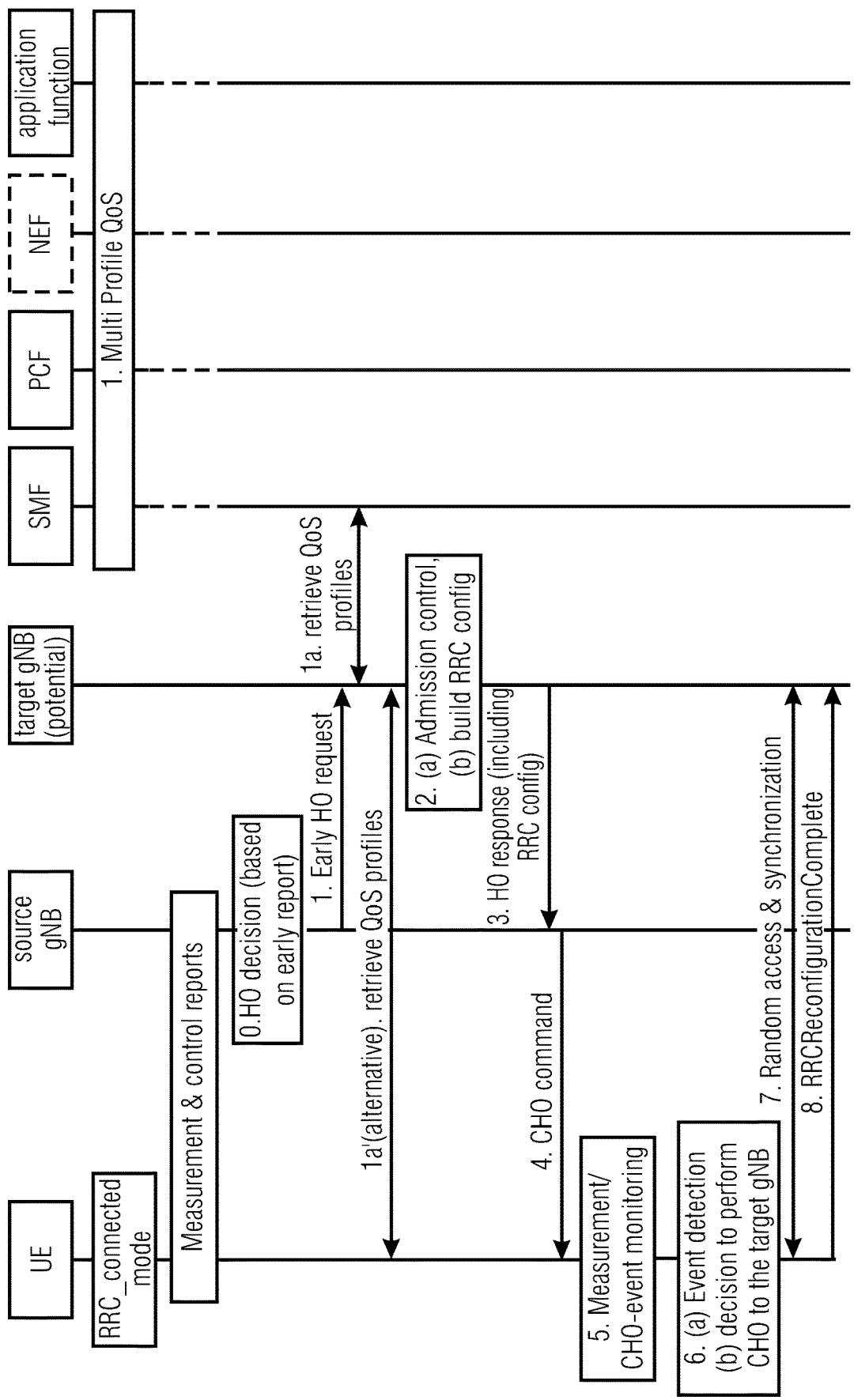
FIG. 10 illustrates another embodiment of the present invention for a conditional handover (CHO) in which the QoS profiles or information about the QoS profiles is obtained directly by the target gNB either from the UE or from one or more network entities.

FIG. 10 illustrates another embodiment for a conditional handover in which the QoS profiles or information about the QoS profiles is obtained directly by the target gNB either from the UE or from one or more of the network entities. In accordance with other embodiments, the target gNB may also obtain the QoS profiles from an external entity connected to the UE via, for example, the Internet. When compared to the process illustrated in FIG. 9, rather than obtaining the information about the QoS profiles by the source station before sending the HO request at "1c.", in accordance with the embodiment of FIG. 10, responsive to receiving the HO request at "1." the target gNB obtains the QoS profiles or the information about them either from the core network, for example from the SMF as indicated at "1a" or from the UE as indicated at "1b.". The remaining part of the procedure may be the same as in FIG. 9 and also in the embodiment of FIG. 10 multiple target gNBs may be involved in the conditional handover procedure and the UE may select, responsive to the conditional handover event detection, the target gNB providing the most preferred QoS profile.

General

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, may be one or more of a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, and/or the base station, BS, may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
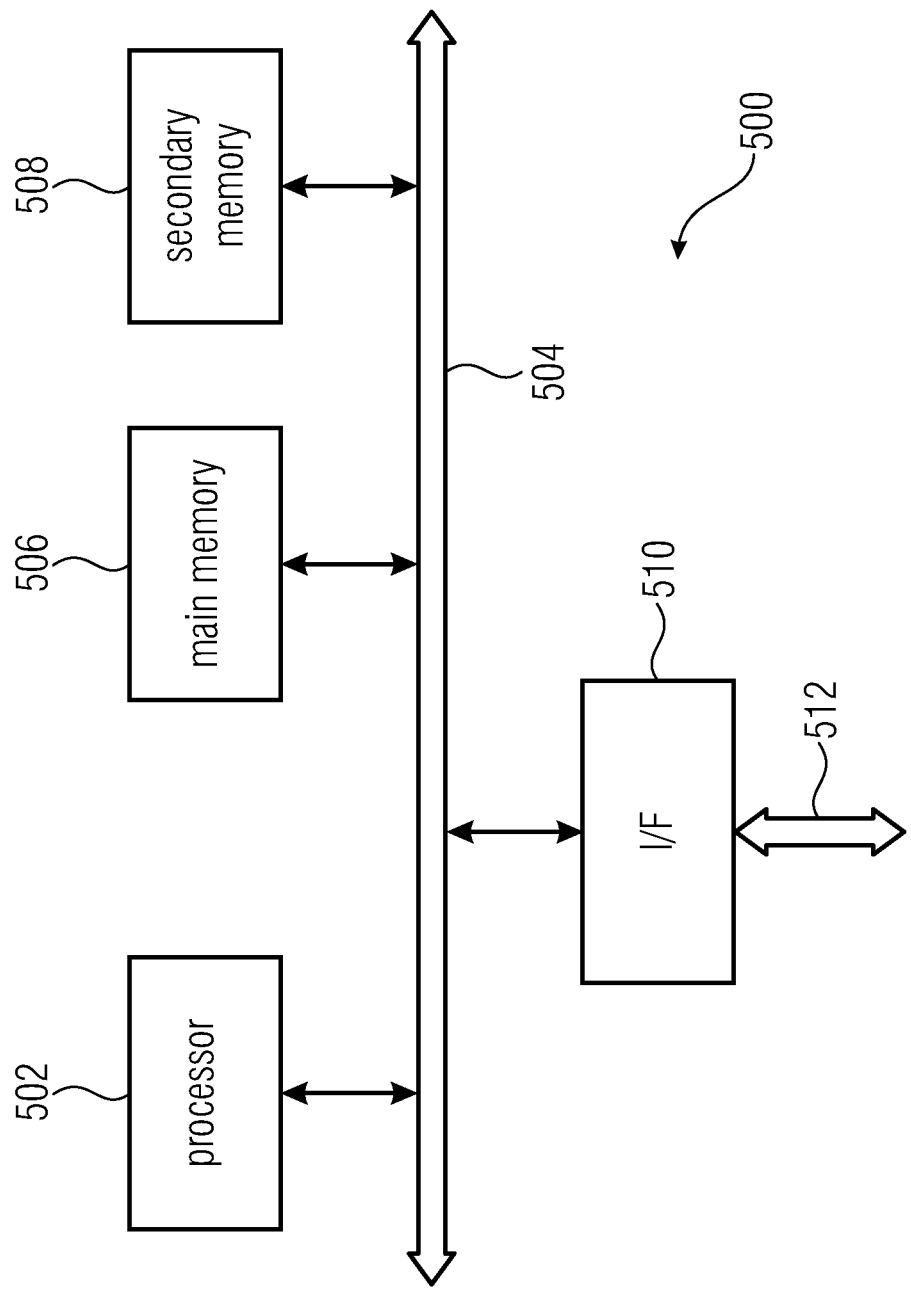
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
sTTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

REFERENCES

[1] 3GPP TR 23.786, Study on architecture enhancements for the Evolved Packet System (EPS) and the 5G System (5GS) to support advanced V2X services
[2] Sassan Ahmadi, "5G NR, Architecture, Technology, Implementation, and Operation of 3GPP New Radio, Standards", Elsevier 2019.
[3] R2-1903515, User plane aspects of conditional handover in NR, Ericsson
[4] R2-1903519, Deconfiguration of conditional handover in NR, Ericsson

The invention claimed is:

1. A wireless communication system, comprising: one or more base stations, and one or more user devices, UEs, wherein, when running a certain application, the UE is to communicate over a session, the session having associated therewith a current Quality of Service, QoS, profile, the current QoS profile selected form a plurality of different QoS profiles associated with the session,
  wherein, in case of a certain event, the wireless communication system is to replace the current QoS profile for the session by a new QoS profile for the session, the new QoS profile selected from a subset of the plurality of different QoS profiles associated with the session,
  wherein the certain event includes a handover, HO, or a conditional handover, CHO, from a source base station to a target base station,
  wherein the subset of the plurality of different QoS profiles includes:
  one or more first QoS profiles having a preference less than the current QoS profile, or one or more second QoS profiles having a preference higher than the current QoS profile, and
  wherein the target base station determines if the current QoS profile can be provided by the target base station, and
  if the current QoS profile cannot be provided by the target base station, the target base station uses as the new QoS profile a QoS profile selected from the one or more first QoS profiles,
  if the current QoS profile can be provided by the target base station, the target base station determines if a QoS profile better than the current QoS profile can be provided by the target base station,
  if a QoS profile better than the current QoS profile cannot be provided by the target base station, the target base station uses as the new QoS profile the current QoS profile,
  if a QoS profile better than the current QoS profile can be provided by the target base station, the target base station uses as the new QoS profile a QoS profile selected from the one or more second QoS profiles.

2. The wireless communication system of claim 1, wherein a QoS profile comprises one of the following QoS parameters or metrics:
  a data rate,
  a peak data rate or an average data rate,
  a quota or specific quantity of data,
  a burst size,
  a latency,
  a delay,
  a jitter,
  a reliability,
  a bit error rate (BER) or packet data rate (PER) requirement,
  a packet loss,
  a goodput,
  a priority,
  a 5G QoS Identifier, 5QI.

3. The wireless communication system of claim 1, wherein
the plurality of QoS profiles associated with the session comprises a first QoS profile and one or more second QoS profiles, and
the first QoS profile is a most preferred QoS profile for the session, and the one or more second QoS profiles are less preferred QoS profiles for the session than the first QoS profile.

4. The wireless communication system of claim 1, wherein the source base station is to
acquire information indicating the subset of the plurality of QoS profiles for the session or the subset of the plurality of QoS profiles for the session
directly or indirectly from the UE, or
from a core network of the wireless communication system, or
over-the-top, OTT, from another entity attached to the UE, and
transmit the information indicating the subset of the plurality of QoS profiles for the session or the subset of the plurality of QoS profiles for the session to the target base station in a handover request.

5. The wireless communication system of claim 1, wherein the target base station is to acquire the subset of the plurality of QoS profiles for the session or information indicating the subset of the plurality of QoS profiles for the session from one or more of:
the application,
the UE,
one or more core network entities of the wireless communication system,
over-the-top, OTT, by another entity attached to the UE.

6. The wireless communication system of claim 1, wherein the target base station is to
include the new QoS profile for the session or the information indicating the new QoS profile for the session into a HO response, and
send the HO response to the source base station.

7. A user device, UE, for a wireless communication system, wherein the UE is served by a source base station and, when running a certain application, the UE is to communicate over a session, the session having associated therewith a current Quality of Service, QoS, profile, the current QoS profile selected form a plurality of different QoS profiles associated with the session,
wherein, in case of a handover, HO, or a conditional handover, CHO, from the source base station to a target base station, the UE is to provide a subset of the plurality of QoS profiles for the session or information indicating a subset of the plurality of QoS profiles for the session so as to allow the target base station to replace the current QoS profile for the session by a new QoS profile for the session,
wherein the subset of the plurality of different QoS profiles includes:
one or more first QoS profiles having a preference less than the current QoS profile, or one or more second QoS profiles having a preference higher than the current QoS profile, and
wherein the target base station determines if the current QoS profile can be provided by the target base station, and
if the current QoS profile cannot be provided by the target base station, the target base station uses as the new QoS profile a QoS profile selected from the one or more first QoS profiles,
if the current QoS profile can be provided by the target base station, the target base station determines if a QoS profile better than the current QoS profile can be provided by the target base station, and
if a QoS profile better than the current QoS profile cannot be provided by the target base station, the target base station uses as the new QoS profile the current QoS profile,
if a QoS profile better than the current QoS profile can be provided by the target base station, the target base station uses as the new QoS profile a QoS profile selected from the one or more second QoS profiles.

8. A base station for wireless communication system, wherein
the base station is a target base station serving to serve a user device, UE, of the wireless communication system following a handover, HO, or a conditional handover, CHO, of the UE from a source base station to the base station, the UE, when running a certain application, communicating over a session, the session having associated therewith a current Quality of Service, QoS, profile, the current QoS profile selected from a plurality of different QoS profiles associated with the session, and
wherein, responsive to a HO request from the source base station, the base station is to replace the current QoS profile for the session by a new QoS profile for the session, the new QoS profile selected form the subset of the plurality of different QoS profiles associated with the session,
wherein the subset of the plurality of different QoS profiles includes:
one or more first QoS profiles having a preference less than the current QoS profile, or one or more second QoS profiles having a preference higher than the current QoS profile, and
wherein the base station determines if the current QoS profile can be provided by the base station, and
if the current QoS profile cannot be provided by the base station, the base station uses as the new QoS profile a QoS profile selected from the one or more first QoS profiles,
if the current QoS profile can be provided by the base station, the base station determines if a QoS profile better than the current QoS profile can be provided by the base station, and
if a QoS profile better than the current QoS profile cannot be provided by the base station, the base station uses as the new QoS profile the current QoS profile,
if a QoS profile better than the current QoS profile can be provided by the base station, the base station uses as the new QoS profile a QoS profile selected from the one or more second QoS profiles.

9. The base station of claim 8, wherein the base station is to
acquire information indicating the subset of the plurality of QoS profiles for the session or the subset of the plurality of QoS profiles for the session from the source base station, which serves the UE, or from the UE or from a core network of the wireless communication system or over-the-top, OTT, from another entity attached to the UE
store the information indicating the subset of the plurality of QoS profiles for the session or the subset of the plurality of QoS profiles for the session.

10. A base station for wireless communication system, the base station is a source base station serving a user device, UE, of the wireless communication system, the UE, when running a certain application, the UE is communicating over a session, the session having associated therewith a current Quality of Service, QoS, profile, the current QoS profile selected form a plurality of different QoS profiles associated with the session, wherein, in case of a handover, HO, or a conditional handover, CHO, of the UE from the base station to a target station, the base station is to provide a subset of the plurality of different QoS profiles associated with the session, wherein the subset of the plurality of different QoS profiles includes:

one or more first QoS profiles having a preference less than the current QoS profile, or one or more second QoS profiles having a preference higher than the current QoS profile, and wherein the target base station determines if the current QoS profile can be provided by the target base station, and if the current QoS profile cannot be provided by the target base station, the target base station uses as the new QoS profile a QoS profile selected from the one or more first QoS profiles, if the current QoS profile can be provided by the target base station, the target base station determines if a QoS profile better than the current QoS profile can be provided by the target base station, and if a QoS profile better than the current QoS profile cannot be provided by the target base station, the target base station uses as the new QoS profile the current QoS profile, if a QoS profile better than the current QoS profile can be provided by the target base station, the target base station uses as the new QoS profile a QoS profile selected from the one or more second QoS profiles.

\* \* \* \* \*